(12) United States Patent
Okuno

(10) Patent No.: US 7,189,785 B2
(45) Date of Patent: Mar. 13, 2007

(54) RUBBER COMPOSITION FOR HIGH-LOAD TRANSMISSION BELT AND HIGH-LOAD TRANSMISSION BELT FROM THE RUBBER COMPOSITION

(75) Inventor: Shigeki Okuno, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 205 days.

(21) Appl. No.: 10/494,308

(22) PCT Filed: Apr. 23, 2003

(86) PCT No.: PCT/JP03/05218

§ 371 (c)(1), (2), (4) Date: May 3, 2004

(87) PCT Pub. No.: WO03/091331

PCT Pub. Date: Nov. 6, 2003

(65) Prior Publication Data

US 2005/0043486 A1 Feb. 24, 2005

(30) Foreign Application Priority Data

Apr. 23, 2002 (JP) ............... 2002-121201

(51) Int. Cl.
*C08F 8/42* (2006.01)
*F16G 1/00* (2006.01)
(52) U.S. Cl. .................. 525/193; 474/237; 474/266
(58) Field of Classification Search ............... 524/397; 525/122, 193; 474/237, 266
See application file for complete search history.

(56) References Cited

U.S. PATENT DOCUMENTS 5,248,730 A * 9/1993 Yamao ................. 525/122
5,610,217 A * 3/1997 Yarnell et al. ............ 524/397

FOREIGN PATENT DOCUMENTS

| EP | 1 300 442 A1 | 4/2003 |
| --- | --- | --- |
| JP | 2-36246 | 2/1990 |
| JP | 4-279645 | 10/1992 |
| JP | 05-017635 | 1/1993 |
| JP | 5-271475 | 10/1993 |
| JP | 5-272595 | 10/1993 |
| JP | 9-176402 | 7/1997 |
| JP | 2000-26674 | 1/2000 |
| JP | 2002-013594 | 1/2000 |
| JP | 2001-310951 | 11/2001 |
| JP | 2001-330083 | 11/2001 |
| WO | WO 97/22662 | 6/1997 |
| WO | WO 97/22663 | 6/1997 |

OTHER PUBLICATIONS

Office Action mailed Sep. 29, 2005 in corresponding German Patent Application No. 103 92 190.7-43 (with full English translation).
*Notice of Reasons for Rejection* dated Jan. 10, 2006 in corresponding Japanese Patent Application No. 2002-121201 with English translation.
Rubber Technology Guidebook, 9th Edition, pp. 181, 182 and 193, Feb. 10, 1980, Masayuki Furuya et al., with partial English Translation.
PCT/JP03/05218/International Search Report/Jun. 24, 2003.

* cited by examiner

*Primary Examiner*—James J. Seidleck
*Assistant Examiner*—Saira B. Raza
(74) *Attorney, Agent, or Firm*—Nixon Peabody LLP; Donald R. Studebaker

(57) ABSTRACT

This invention has an object of enhancing the cold resistance of a heavy duty power transmission V-belt without impairing its durability at high temperatures, ensuring its sufficient power transmission capability and concurrently enhancing its permanent set resistance. To attain the object, the invention employs, for a rubber element of the belt, a rubber composition in which 20 to 40 parts by weight of a metal salt monomer of an organic acid and 5 to 35 parts by weight of short fibers are mixed into 100 parts by weight of a rubber component composed of EPDM and HNBR in their ratio of 55/45 to 75/25, the rubber hardness measured with a durometer Type D is 40 to 60, the value of $t_5$ given by a Gehman torsion test is −50° C. to −35° C., and the amount of acetone extract from the rubber component is 9% or less.

11 Claims, 16 Drawing Sheets

RUBBER COMPOSITION FOR HIGH-LOAD TRANSMISSION BELT AND HIGH-LOAD TRANSMISSION BELT FROM THE RUBBER COMPOSITION

TECHNICAL FIELD

This invention relates to rubber compositions for heavy duty power transmission belts and heavy duty power transmission belts using the same.

BACKGROUND ART

Known variable speed V-belts for automotive four-wheel vehicles, motorcycles and the like include a single cogged V-belt with cogs on the belt inner face only, a double cogged V-belt with cogs on both the belt inner and back faces, and a hybrid V-belt in which a plurality of blocks are engaged at specified pitches and intervals in the belt lengthwise direction with bilaterally paired tension members. For heavy duty power transmission V-belts, lateral pressures from pulleys are high. Therefore, in order to withstand such high lateral pressures, rubber compositions used for the above various kinds of variable speed heavy duty power transmission belts are required to have a high elastic modulus after crosslinked. In addition, these rubber compositions after crosslinked are also required to have excellent heat aging resistance and flex fatigue cracking resistance and exhibit a small permanent set due to temperature and pressure.

To meet these requirements, use has conventionally been made of peroxide-crosslinked hydrogenated acrylonitrile butadiene rubbers reinforced with a metal salt monomer of an unsaturated carboxylic acid, typically, such as zinc dimethacrylate or zinc diacrylate. For such hydrogenated acrylonitrile butadiene rubbers (HNBR), as the content of metal salt monomer is increased, their elastic modulus becomes higher and therefore they become more advantageous to heavy duty power transmission. However, on the other side of the coin, the HNBRs deteriorate their heat aging resistance and flex fatigue cracking resistance, thereby tending to increase permanent set. To cope with this, a technique has conventionally been employed which determines an optimal amount of the unsaturated metal salt monomer mixed into a rubber composition for a belt in consideration of the balance between belt power transmission capability required according to the particular application, and required heat resistance, cracking resistance and low permanent deformability.

Meanwhile, there has been increasing demand in recent years for development of power transmission belts which can satisfy not only the foregoing characteristic requirements but also their durability requirement even when used in cold climates such as North America and North Europe, or in other words, globally serviceable power transmission belts.

If the above-mentioned HNBR-based rubber compositions are used to meet, for example, flexibility and softness requirement at −35° C., a large amount of plasticizer such as oil needs to be mixed thereinto. Then, the resultant rubbers would have adverse effects of decreased elastic modulus and increased permanent set on belts using the rubbers, and in turn the belts would be difficult to preserve the above good balance among the foregoing characteristics.

On the other hand, attention has in recent years been given, as rubber materials for power transmission belts having both heat resistance and cold resistance, to ethylene-α-olefin elastomers such as ethylene-propylene copolymer (EPM), ethylene-propylene-diene terpolymer (EPDM) or ethylene-octene copolymer.

For ethylene-α-olefin elastomer-based rubber compositions, however, the resultant rubbers have a low elastic modulus. It may be possible to enhance the elastic modulus of such rubber by increasing the amount of filler such as carbon black. In that case, however, there arise a problem that a belt using the rubber exhibits an extremely large self-heating when bent and has a poor cracking resistance, thereby not reaching a practical level. To solve this problem, it has been considered to enhance the rubber elastic modulus by adding a metal salt monomer of an unsaturated carboxylic acid to the ethylene-α-olefin elastomer.

For example, Japanese Unexamined Patent Publication (Kokai) No. 5-17635 describes a belt rubber composition in which 100 parts by weight of an ethylene-α-olefin elastomer having a Mooney viscosity ($ML_{1+4}$, 100° C.) of 10 to 70 and containing 75 mol % or more of ethylene units is mixed with 15 to 80 parts by weight of a metal salt monomer of an ethylene-unsaturated carboxylic acid and 0.2 to 10 parts by weight of an organic peroxide.

International Patent Publication Number WO97/22662 describes a belt rubber composition in which 100 parts by weight of an ethylene-α-olefin elastomer having an ethylene content of 40 to 70 wt % is mixed with 32 to 100 parts by weight of a metal salt of an unsaturated carboxylic acid.

Japanese Unexamined Patent Publication (Kohyo) No. 9-500930 and its corresponding U.S. Pat. No. 5,610,217 describe belt rubber compositions in which 100 parts by weight of an ethylene-α-olefin elastomer is mixed with 1 to 30 parts by weight of a metal salt of an α-β-unsaturated organic acid and 250 parts by weight or less of a reinforcing filler. These documents also describe a technique that up to 25 parts by weight of HNBR is blended into 100 parts by weight of the ethylene-α-olefin elastomer.

International Patent Publication Number WO97/22663 describes a belt rubber composition in which a basic rubber blend composed of 41 to 49 parts by weight of an ethylene-α-olefin elastomer and 51 to 59 parts by weight of HNBR is mixed with 5 to 80.5 parts by weight of a metal salt of an unsaturated carboxylic acid.

However, in the case of adding a metal salt monomer of an unsaturated carboxylic acid to an ethylene-α-olefin elastomer, the resultant rubber has a high elastic modulus but extremely deteriorates its cracking resistance. The above-described Japanese Unexamined Patent Publication (Kokai) No. 5-17635 mentions that a rubber composition in which an ethylene-α-olefin elastomer having an ethylene content of about 70 mol % or less is mixed with a metal salt monomer of an unsaturated carboxylic acid would not provide high strength, and presumes that this is due to poor dispersibility of the metal salt monomer. The above-described problem of deteriorated cracking resistance is presumably also due to poor dispersibility of the metal salt monomer. In the above case of using the ethylene-α-olefin elastomer containing 75 mol % or more of ethylene units, the resultant rubber achieves a high strength, but causes crystallization at low temperatures because of its high ethylene content. Therefore, it does not go far enough to satisfy the flex resistance of a belt at low temperatures.

The above technique of blending an ethylene-α-olefin elastomer and HNBR may be effective in enhancing the cold resistance of the resultant rubber. However, since the content of ethylene-α-olefin elastomer is as small as 41 to 49 parts by weight in 100 parts by weight of the entire rubber component, this does not have a sufficient effect of enhancing the rubber cold resistance. On the other hand, if the amount of oil mixed is increased in order to improve the cold resistance, this easily causes a permanent deformation (permanent set) of the rubber.

Furthermore, in the above case of a blending ratio of 25 parts by weight or less of HNBR to 100 parts by weight of ethylene-α-olefin elastomer, its high blending ratio of ethylene-α-olefin elastomer increases the cold resistance but deteriorates the cracking resistance, which is disadvantageous to durability at high temperatures.

The present invention is directed to the fabrication of a heavy duty power transmission belt such as a variable speed belt using a rubber composition obtained by blending ethylene-α-olefin elastomer and HNBR, and has an object of achieving a good balance among high elastic modulus, heat aging resistance, cracking resistance, permanent set resistance and cold resistance.

Furthermore, the present invention has another object of enhancing the cold resistance of the belt without impairing its durability at high temperatures, ensuring its sufficient power transmission capability and concurrently enhancing its permanent set resistance.

DISCLOSURE OF INVENTION

In the present invention, a suitable amount of metal salt monomer is added into a rubber composition of HNBR and ethylene-α-olefin elastomer with their blending ratio at a suitable value, thereby enhancing the cold resistance of the resultant belt without impairing its durability at high temperatures, and ensuring its sufficient power transmission capability. Furthermore, the cold resistance improvement effect of ethylene-α-olefin elastomer is used to reduce the amount of plasticizer added such as oil, thereby improving permanent set resistance.

To be more specific, one aspect of the present invention is directed to a rubber composition for a heavy duty power transmission belt which has a rubber hardness of 40 to 60 when measured with a durometer Type D, a value of $t_5$ of −50° C. to −35° C. when given by a Gehman torsion test, and an amount of acetone extract of 9% or less, wherein:

(a) 20 to 40 parts by weight of a metal salt monomer of an organic acid is mixed into 100 parts by weight of a rubber component composed of an ethylene-α-olefin elastomer and hydrogenated acrylonitrile butadiene rubber;

(b) 5 to 35 parts by weight of short fibers are mixed into 100 parts by weight of the rubber component; and (c) the amount of the ethylene-α-olefin elastomer in 100 parts by weight of the rubber component is 55 to 75 parts by weight.

Since the amount of the ethylene-α-olefin elastomer is 55 to 75 parts by weight in 100 parts by weight of a rubber component composed of the ethylene-α-olefin elastomer and hydrogenated acrylonitrile butadiene rubber, this is advantageous in ensuring the cold resistance of the belt without impairing its durability at high temperatures. In this context, if the amount of the ethylene-α-olefin elastomer is less than 55 parts by weight, this does not have a sufficient effect of enhancing the cold resistance. On the other hand, if the amount of the ethylene-α-olefin elastomer exceeds 75 parts by weight, the cold resistance is improved but the cracking resistance is deteriorated. This is disadvantageous in terms of the ensuring of the durability at high temperatures. The amount of the ethylene-α-olefin elastomer more preferably ranges from 60 to 70 parts by weight.

Furthermore, since the mixing ratio of the metal salt monomer of the organic acid is 20 to 40 parts by weight, the hydrogenated acrylonitrile butadiene rubber can be reinforced. This increases the elastic modulus, and in other words, increases the rubber hardness to enhance the heavy duty power transmission capability of the belt. In this context, if the mixing ratio of the metal salt monomer of the organic acid is less than 20 parts by weight, this does not have a sufficient effect of the rubber reinforcement. On the other hand, if the mixing ratio of the metal salt monomer of the organic acid exceeds 40 parts by weight, this improves the elastic modulus but is disadvantages in terms of the cracking resistance. The mixing ratio of the metal salt monomer of the organic acid more preferably ranges from 25 to 30 parts by weight.

Furthermore, as described above, the amount of the ethylene-α-olefin elastomer is 55 to 75 parts by weight per 100 parts by weight of the rubber component, thereby improving the cold resistance. Therefore, the amount of plasticizer mixed such as oil can be reduced, and in turn the amount of oil mixed can be reduced to zero, which is advantageous in enhancing the permanent set resistance of the belt. The amount of acetone extract of 9% or less is aimed at reducing the amount of plasticizer mixed such as oil to enhance the permanent set resistance. The amount of acetone extract is more preferably 6% or less. Furthermore, in mixing the oil, its mixing ratio is preferably 5 parts by weight or less per 100 parts by weight of the rubber component.

The mixing of short fibers is aimed at increasing the rubber hardness while suppressing rubber self-heating at belt bending, thereby improving the belt power transmission capability. More specifically, a belt is repeatedly bent during travels around pulleys. If the matrix rubber constituting the belt (rubber component except for short fibers) is increased in hardness for the purpose of enhancing the belt power transmission capability, then the rubber increases the amount of heat produced at belt bending to be prone to thermal degradation. Therefore, the rubber hardness is increased by the mixing of short fibers, while the amount of heat produced by the rubber at belt bending is suppressed to a low level.

In the above case, if the mixing ratio of short fibers is less than 5 parts by weight, a sufficient effect of the rubber reinforcement cannot be achieved. Therefore, there arises a need to increase the hardness of the matrix rubber, which is disadvantageous in suppressing the heat production of the rubber. On the other hand, if the mixing ratio of short fibers exceeds 35 parts by weight, their dispersibility in the rubber is degraded, resulting in deteriorated physical properties of rubber for a power transmission belt.

The short fibers preferably comprise organic short fibers with a tensile modulus of 15 GPa to 300 GPa, and 5 to 20 parts by weight of the organic short fibers are preferably mixed into the rubber component. More specifically, if the tensile modulus is less than 15 GPa, the rubber reinforcement effect is low. This creates a need to enhance the hardness of the matrix rubber or increase the mixing ratio of short fibers, which leads to the above problem of heat production or poor dispersibility. The tensile modulus ranges preferably from 15 GPa to 100 GPa, or more preferably from 60 GPa to 100 GPa.

The present invention preferably employs, as the ethylene-α-olefin elastomer, ethylene-propylene copolymer (EPM), ethylene-propylene-diene terpolymer (EPDM) or ethylene-octene copolymer.

The bound acrylonitrile content in the hydrogenated acrylonitrile butadiene rubber may be approximately 40%. However, a bound acrylonitrile content of 20% or less can achieve both the cold resistance and permanent set resistance of the belt even when the amount of the ethylene-α-olefin elastomer is small.

The present invention can employ, as the metal salt monomer of the organic acid, a metal salt of an unsaturated monocarboxylic acid such as acrylic acid, methacrylic acid, crotonic acid or 3-butenoic acid, a metal salt of an unsaturated dicarboxylic acid such as maleic acid, fumaric acid or itaconic acid, or a metal salt of an unsaturated dicarboxylic acid monoester such as monomethyl maleate, monoethyl maleate or monoethyl itaconate. The metal used is not particularly limited so long as it forms a salt with an ethylene-unsaturated carboxylic acid, but appropriate metals include zinc, magnesium, calcium and aluminium. The use of zinc diacrylate or zinc dimethacrylate is particularly preferable.

The organic fibers used in the present invention include poly(paraphenylene-terephthalamide) fibers, co-poly(paraphenylene-3,4'-oxydiphenylene-terephthalamide) fibers, poly(metaphenylene-isophthalamide) fibers, poly(paraphenylene-benzobisoxazole) fibers, polyvinyl alcohol fibers, and holaromatic polyester fibers. The organic fibers used may be either of a single type or a blend of two or more types.

In compounding the above constituents, the metal salt monomer of the organic acid and the hydrogenated acrylonitrile butadiene rubber are preferably premixed to sufficiently disperse the metal salt monomer of the organic acid in the hydrogenated acrylonitrile butadiene rubber, and the hydrogenated acrylonitrile butadiene rubber containing the dispersed metal salt monomer of the organic acid, the ethylene-α-olefin elastomer and the short fibers are preferably mixed into a compound. This enhances the dispersibility of the metal salt monomer of the organic acid to ensure the reinforcement of the hydrogenated acrylonitrile butadiene rubber, which is advantageous in improving the cracking resistance.

Furthermore, if necessary, in order to enhance the compatibility between ethylene-α-olefin elastomer and hydrogenated acrylonitrile butadiene rubber, polar groups such as carboxyl groups can be introduced into one or both of the polymers.

The rubber composition for a heavy duty power transmission belt preferably has a rubber hardness of 40 to 60 when measured with a durometer Type D, and a value of $t_5$ of −50° C. to −35° C. when measured by a Gehman torsion test.

The rubber hardness preference of 40 or more is because the belt can thereby attain good power transmission capability under heavy duty conditions. In order to enhance such power transmission capability, higher rubber hardness is more preferable. However, if the rubber hardness exceeds 60, the belt extremely deteriorates its cracking resistance and thus extremely shortens the life from a high-temperature durability test. Therefore, the rubber hardness is preferably not more than 60. More preferably, the rubber hardness ranges from 45 to 58.

The $t_5$ preference of −35° C. or less in a Gehman torsion test is because the belt can thereby attain the low-temperature durability (cold resistance). In order to obtain an excellent low-temperature durability, $t_5$ is preferably −37° C. or less.

Another aspect of the present invention is a rubber composition for a heavy duty power transmission belt, wherein a metal salt monomer of an organic acid and short fibers are mixed into a rubber component composed of an ethylene-α-olefin elastomer and hydrogenated acrylonitrile butadiene rubber, the rubber hardness measured with a durometer Type D is 40 to 60, the value of $t_5$ given by a Gehman torsion test is −50° C. to −35° C., and the amount of acetone extract from the rubber component is not more than 9% or not more than 6%.

Therefore, this aspect of the present invention can achieve a good balance among high elastic modulus, heat aging resistance, cracking resistance, permanent set resistance and cold resistance, and particularly enhance the cold resistance of the belt without impairing its high-temperature durability, ensure its sufficient power transmission capability and concurrently enhance its permanent set resistance.

The rubber compositions described so far are applicable to a cogged V-belt in which a large number of cogs are formed at specified pitches on the belt inner face only or on both the belt inner and back faces. More specifically, the rubber compositions are applicable to at least one of rubber elements constituting the cogged V-belt, for example, a compression rubber which is the rubber element closer to the belt inner face than the tension member, a tension rubber which is the rubber element closer to the belt back face, both of the tension and compression rubbers, or an adhesion rubber for holding the tension member at a proper position.

These applications can achieve a good balance among high elastic modulus, heat aging resistance, cracking resistance, permanent set resistance and cold resistance, and particularly enhance the cold resistance of the belt without impairing its high-temperature durability, ensure its sufficient power transmission capability and concurrently enhance its permanent set resistance, which is advantageous in enhancing the belt durability.

Furthermore, the above rubber compositions are applicable to a heavy duty power transmission V-belt comprising: a tension member formed of a rubber layer having a cord embedded thereinto; and a plurality of blocks engaged at specified pitches and intervals in the lengthwise direction of the belt with the tension member, and specifically to the rubber layer of the heavy duty power transmission V-belt. This application can achieve a good balance among high elastic modulus, heat aging resistance, cracking resistance, permanent set resistance and cold resistance, and particularly enhance the cold resistance of the belt without impairing its high-temperature durability, ensure its sufficient power transmission capability and concurrently enhance its permanent set resistance, which is advantageous in enhancing the belt durability.

As described so far, according to the rubber composition of the present invention, rubber constituting a belt can achieve a good balance among high elastic modulus, heat aging resistance, cracking resistance, permanent set resistance and cold resistance, which is advantageous in enhancing the belt durability.

Furthermore, since the cogged V-belt or the heavy duty power transmission V-belt with a large number of blocks engaged with a tension member according to the present invention employs the rubber composition for a rubber element of the belt, the rubber element can achieve a good balance among high elastic modulus, heat aging resistance, cracking resistance, permanent set resistance and cold resistance, which is advantageous in enhancing the belt durability.

BEST MODE FOR CARRYING OUT THE INVENTION

Hereinafter, embodiments of the present invention will be described with reference to the drawings.

<Heavy Duty Power Transmission Belt Construction>

Cogged V-Belt

Figure 1:
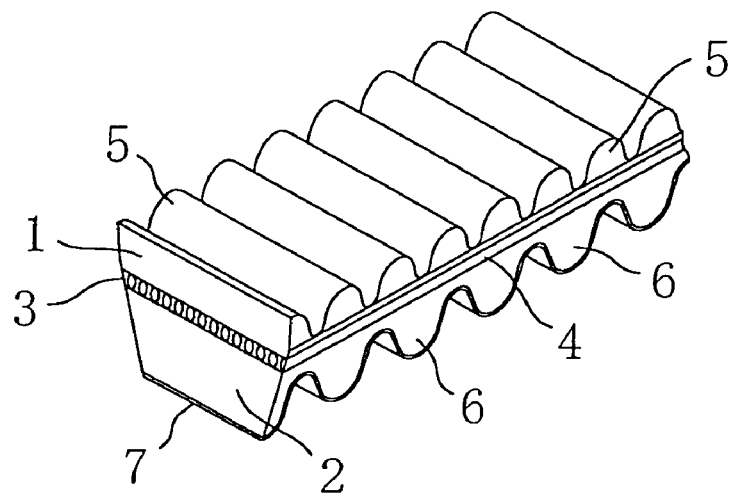
FIG. 1 is a perspective view of part of a cogged V-belt according to the presenting invention.
Figure 2:
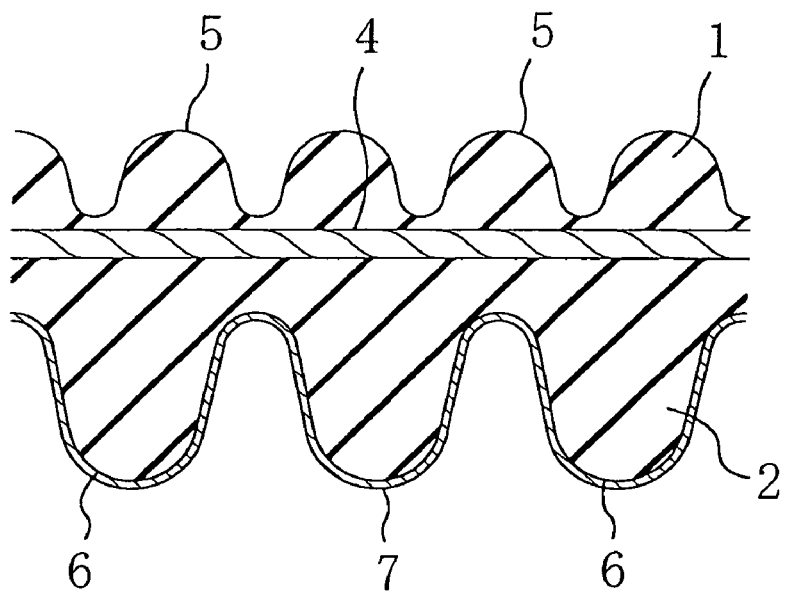
FIG. 2 is a side view of the above cogged V-belt.

As shown in FIGS. 1 and 2, a cogged V-belt 10 comprises a tension rubber layer 1 at the back face, a compression rubber layer 2 at the inner face, an adhesion rubber layer 3 interposed between the tension and compression rubber layers 1 and 2, and a cord 4 embedded in the adhesion rubber layer 3. The surface of the tension rubber layer 1 is provided with a large number of cogs 5 at specified pitches in the belt lengthwise direction to have a corrugated shape. The surface of the compression rubber layer 2 is also provided with a large number of cogs 6 at specified pitches in the belt lengthwise direction to have a corrugated shape. Further, the surface of the compression rubber layer 2 is covered with a bottom fabric 7. The cord 4 is placed spirally in the adhesion rubber layer 3 with its turns extending in the belt lengthwise direction and aligned at specified pitches in the belt widthwise direction.

Para-aramid fibers Kevlar® produced by DuPont are used for the cord 4. A nylon fabric is used as the bottom fabric 7. A rubber composition according to the present invention is used for the tension and compression rubber layers 1 and 2. The rubber layers 1 and 2 contain short fibers oriented in the belt widthwise direction.

Heavy Duty Power Transmission Hybrid V-Belt

Figure 3:
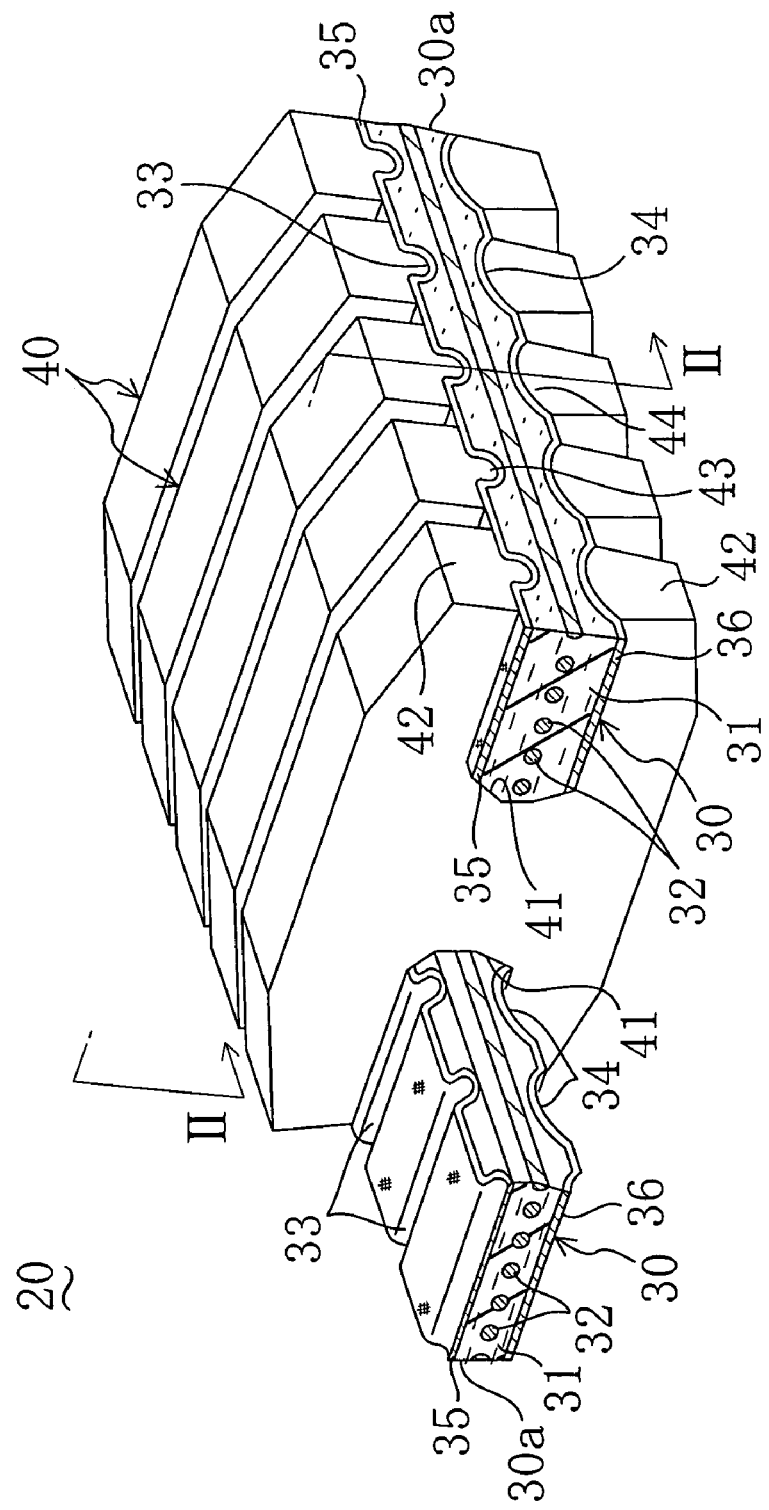
FIG. 3 is a perspective view of part of a hybrid V-belt according to the presenting invention.

As shown in FIG. 3, this V-belt 20 is constituted by bilaterally paired endless tension members 30 and 30, and a large number of blocks 40, 40, . . . engaged at specified intervals in the belt lengthwise direction with the tension members 30 and 30.

Each tension member 30 is designed as an integral structure consisting of: a rubber layer 31; a cord 32 placed spirally in the rubber 31 with its turns extending in the belt lengthwise direction and aligned at specified pitches in the belt widthwise direction; and top and bottom fabrics 35 and 36 covering the top and bottom faces of the rubber layer 31. The top face of each tension member 30 is formed with groove-like upper recesses 33, 33, . . . extending in the belt widthwise direction and at specified pitches in correspondence with the blocks 40. The bottom face of each tension member 30 is formed with lower recesses 34, 34, . . . extending in the belt widthwise direction and at specified pitches in correspondence with the upper recesses 33, 33, . . .

The cord 32 is formed from a twisted yarn or plait made of high strength, high elastic modulus aramid fibers and subjected to dipping into an RFL liquid and rubber cement and drying.

The top and bottom fabrics 35 and 36 are formed of an aramid woven fabric that is processed to have stretchability in the belt lengthwise direction and rubberized.

Each block 40 has fitting slots 41 and 41 formed in the right and left sides for detachably receiving the corresponding tension members 30 from sideways. Further, each block 40 also has contact parts 42, 42 for contacting a groove surface of a pulley on its side surfaces located above and below each fitting slot 41. The tension members 30 and 30 are fitted into the fitting slots 41 and 41 of each block 40, respectively.

On the upper wall surface of each fitting slot 41 of each block 40, an upper ridge 43 is formed which extends in the belt widthwise direction and is mated with the corresponding upper recess 33 in the top face of the tension member 30. On the lower wall surface of each fitting slot 41, a lower ridge 44 is formed which extends in the belt widthwise direction and is mated with the corresponding lower recess 34 in the bottom face of the tension member 30. Through the mating engagement of the upper and lower ridges 43 and 44 of each block 40 with the upper and lower recesses 33 and 34 of the tension member 30, the blocks 40, 40, . . . are securely engaged with the tension members 30 and 30 so as not to be wobbled in the belt lengthwise direction.

Each block 40 is formed from a hard, thermosetting phenol resin material mixed with short aramid fibers, milled carbon fibers or the like. Inside the block 40, as shown in FIGS. 4 and 5, a high strength, high elastic modulus reinforcing member 45 made of a lightweight aluminum alloy or other like material is embedded substantially in the thicknesswise middle of the block 40.

The reinforcing member 45 consists of upper and lower beams 45a and 45b extending in the widthwise (transverse) direction and a center pillar 45c vertically connecting between laterally middle portions of both the beams 45a and 45b, and is thereby formed in substantially H-shape.

Figure 4:
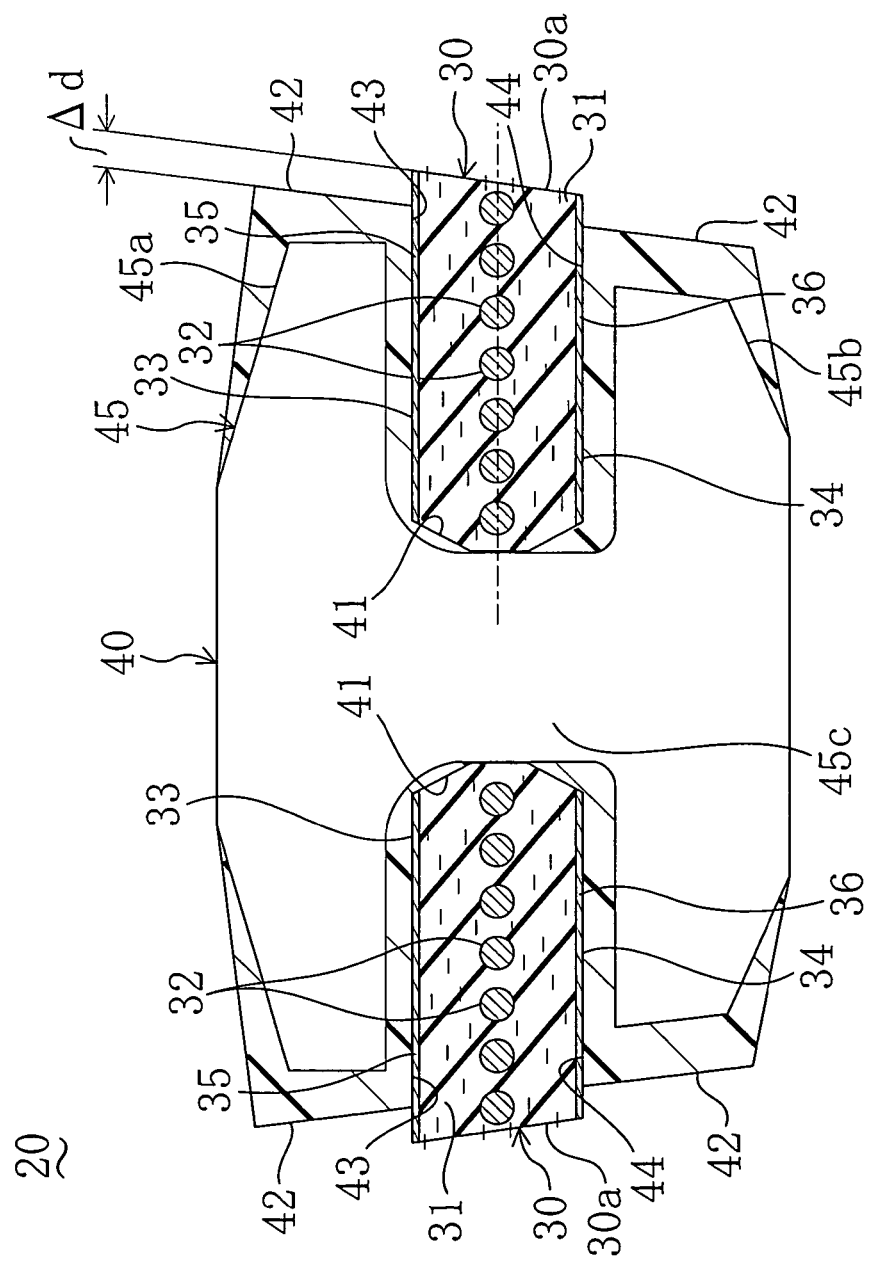
FIG. 4 is an enlarged cross-sectional view taken along the line II—II of FIG. 3.
Figure 5:
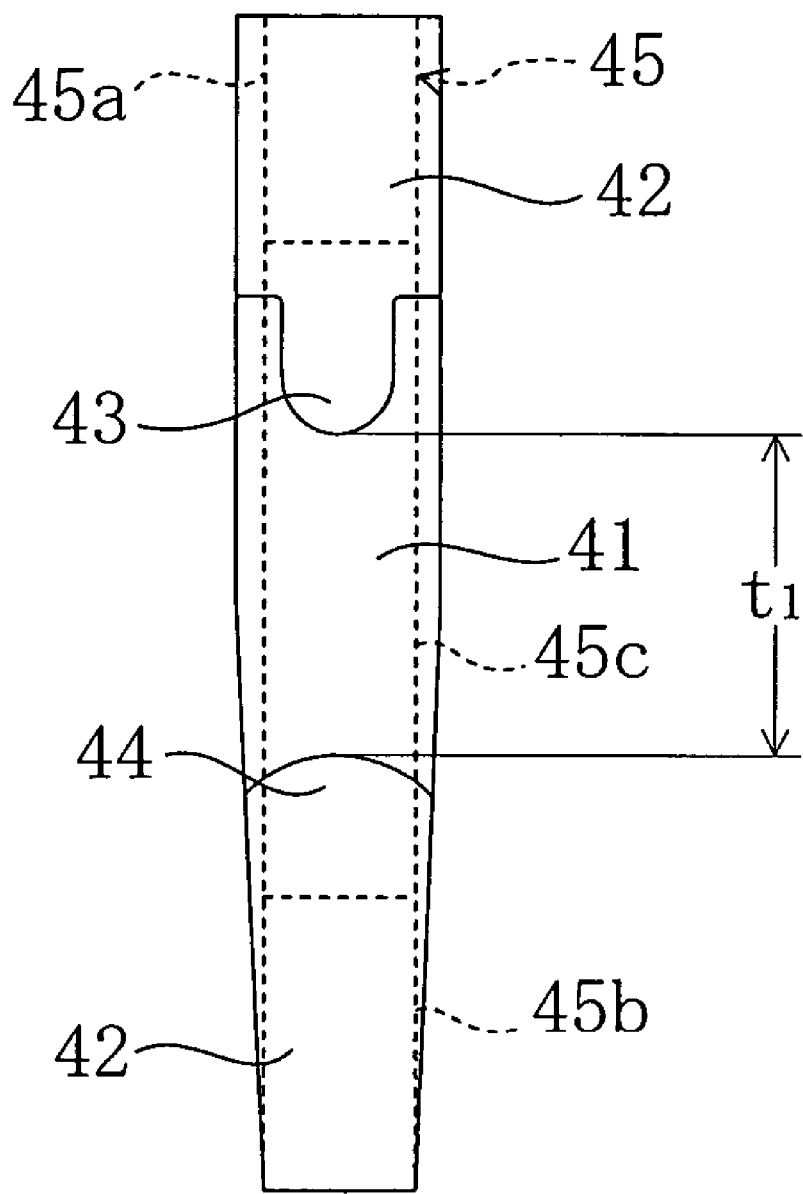
FIG. 5 is an enlarged side view of a block of the above hybrid V-belt.
Figure 6:
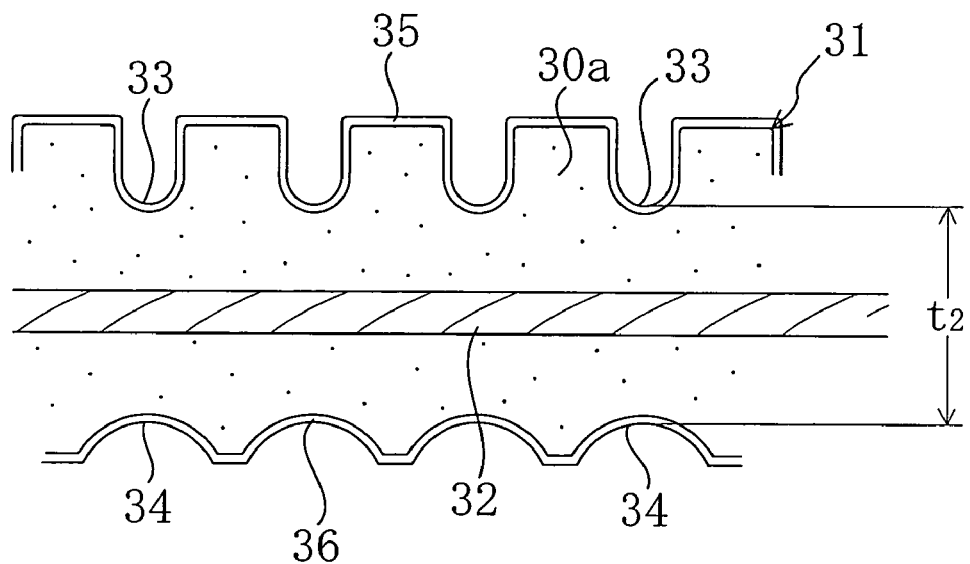
FIG. 6 is an enlarged side view of a tension member of the above hybrid V-belt.

Furthermore, the distance t2 in the tension member 30 as shown in FIG. 6, i.e., the distance between the bottom surface of the upper recess 33 (more specifically, the top surface of the upper fabric 35) and the bottom surface of the corresponding lower recess 34 (more specifically, the bottom surface of the lower fabric 36), is previously set slightly, for example, about 0.03 to 0.15 mm larger than the distance t1 in each block 40 as shown in FIG. 4, i.e., the distance between the lower end of the upper ridge 43 and the upper end of the lower ridge 44 (t2>t1). Under this setting, in assembling individual blocks 40 onto the tension member 30, the tension member 30 is incorporated into each block 40 while thicknesswise compacted by the block 40.

As shown in FIG. 4, the lateral side surface 30a of the tension member projects slightly (for example, 0.03 to 0.15 mm) beyond the resin-made contact parts 42, 42 of each block 40 outward in the belt widthwise direction (a projection allowance Δd). The lateral side surface 30a of the tension member contact the pulley groove surface together with the contact parts 42 on the side surface of the block 40, so that the block 40 and the tension member 30 take up their shares of lateral pressure from the pulley. Thus, shocks at the entry of each block 40 into the pulley groove are eased by the lateral side surface 30a of the tension member 30.

A rubber composition according to the present invention is used for the rubber layer 31. The rubber layer 31 includes short fibers oriented in the belt widthwise direction.

<Rubber Composition>

Table 1 shows the specification of ingredients of a rubber composition used for the rubber layers 1 and 2 of the above cogged V-belt and the rubber layer 31 of the tension member 30 of the above hybrid V-belt.

TABLE 1

| Ingredients | Makers | Trade names |
| --- | --- | --- |
| EPDM | JSR | EP24 |
| EPM | JSR | EP11 |
| Ethylene-octene copolymer | DuPont Dow Elastomers Japan | Engage 8180 |
| HNBR 1 | Zeon Corporation | Zetpol 2010 |
| HNBR 2 | Zeon Corporation | Zetpol 4110 |
| Zinc dimethacrylate | Kawaguchi Chemical | Actor ZMA |
| Zinc diacrylate | Asada Chemical | zinc diacrylate powder |
| Antioxidant | Ouchi Shinko Chemical | Nocrac 224 |
| Zinc oxide | Sakai Chemical | zinc oxide Type 3 |
| Silica | Tokuyama | Tokusil U-15 |
| Oil 1 | Asahi Denka | ADK CIZER RS107 |
| Oil 2 | Idemitsu Kosan | PW-90 |
| Peroxide | Nippon Oil & Fats | Perximon F40 |
| Short nylon fibers | Asahi Kasei | Nylon 66, type T-5 |
| Short co-poly(paraphenylene-3,4'-oxydiphenylene-terephthalamide) fibers | Teijin | Technora |
| Short poly(paraphenylene-terephthalamide) fibers | DuPont | Kevlar 29 |
| Short poly(metaphenylene-isophthalamide) fibers | Teijin | Conex HT |
| Short poly(paraphenylene-benzobisoxazole) fibers | Toyobo | Zylon-HM |
| Short polyvinyl alcohol fibers | Kuraray | Kuralon 5501 |
| Short holaromatic polyester fibers | Kuraray | Vectran HT |

Tables 2-1 to 2-16 and Tables 3-1 and 3-2 show the results obtained by examining physical properties of a rubber composition and its effects on resultant cogged and hybrid V-belts by changing the formulation of its ingredients. In the rows of "Ingredients" in the following tables, the values are given in parts by weight.

TABLE 2-1

| | Formulation No. | 1 | 2 | 3 | 4 | 5 | 6 | 7 | 8 |
|---|---|---|---|---|---|---|---|---|---|
| Ingredients | EPDM | 25 | 25 | 25 | 25 | 25 | 25 | 25 | 25 |
| | HNBR 1 | 75 | 75 | 75 | 75 | 75 | 75 | 75 | 75 |
| | Zinc oxide | 10 | 10 | 10 | 10 | 10 | 10 | 10 | 10 |
| | Antioxidant | 1 | 1 | 1 | 1 | 1 | 1 | 1 | 1 |
| | Silica | 20 | 20 | 20 | 20 | 20 | 20 | 20 | 20 |
| | Oil 1 | 10 | 10 | 10 | 10 | 10 | 15 | 15 | 15 |
| | Oil 2 | 0 | 0 | 0 | 0 | 0 | 0 | 0 | 0 |
| | Peroxide | 7 | 7 | 7 | 7 | 7 | 7 | 7 | 7 |
| | Zinc dimethacrylate | 10 | 20 | 30 | 40 | 50 | 10 | 20 | 30 |
| | Short nylon fibers | 10 | 10 | 10 | 10 | 10 | 10 | 10 | 10 |
| | Short Technora fibers | 10 | 10 | 10 | 10 | 10 | 10 | 10 | 10 |
| Rubber properties | Rubber hardness | 35 | 41 | 44 | 53 | 68 | 33 | 37 | 42 |
| | Gehman torsion $T_5$ (° C.) | −30.8 | −30.7 | −30.3 | −30.0 | −29.8 | −33.6 | −33.2 | −33.0 |
| | Amount of acetone extract (%) | 8.7 | 8.4 | 8.1 | 7.8 | 7.5 | 11.2 | 10.8 | 10.4 |
| | Permanent set (%) | 32.3 | 39.2 | 46.2 | 53.1 | 60.0 | 34.2 | 41.1 | 48.1 |
| Cogged V-belt | Center distance variation (%) | | 2.5 | 2.3 | 2.2 | | | | |
| | Transmitted torque (Nm) | 122 | 134 | 136 | 139 | 148 | | | |
| | High-temp. durable life (hrs) | 170 | 158 | 152 | 131 | 51 | | | |
| | Low-temp. durable life (cycles) | | 11 | 10 | 8 | | | | |
| Hybrid V-belt | Post-travel interference (mm) | | −0.22 | −0.22 | −0.21 | | | | |
| | Transmitted torque (Nm) | 380 | 430 | 435 | 446 | 476 | | | |
| | High-temp. durable life (hrs) | 495 | 478 | 471 | 436 | 149 | | | |
| | Low-temp. durable life (cycles) | | 15 | 13 | 10 | | | | |

TABLE 2-2

| | Formulation No. | 9 | 10 | 11 | 12 | 13 | 14 | 15 |
|---|---|---|---|---|---|---|---|---|
| Ingredients | EPDM | 25 | 25 | 25 | 25 | 25 | 25 | 25 |
| | HNBR 1 | 75 | 75 | 75 | 75 | 75 | 75 | 75 |
| | Zinc oxide | 10 | 10 | 10 | 10 | 10 | 10 | 10 |
| | Antioxidant | 1 | 1 | 1 | 1 | 1 | 1 | 1 |
| | Silica | 20 | 20 | 20 | 20 | 20 | 20 | 20 |
| | Oil 1 | 15 | 15 | 20 | 20 | 20 | 20 | 20 |
| | Oil 2 | 0 | 0 | 0 | 0 | 0 | 0 | 0 |
| | Peroxide | 7 | 7 | 7 | 7 | 7 | 7 | 7 |
| | Zinc dimethacrylate | 40 | 50 | 10 | 20 | 30 | 40 | 50 |
| | Short nylon fibers | 10 | 10 | 10 | 10 | 10 | 10 | 10 |
| | Short Technora fibers | 10 | 10 | 10 | 10 | 10 | 10 | 10 |
| Rubber properties | Rubber hardness | 53 | 64 | 31 | 37 | 42 | 50 | 61 |
| | Gehman torsion $T_5$ (° C.) | −32.8 | −32.4 | −36.4 | −36.1 | −35.8 | −35.5 | −34.9 |
| | Amount of acetone extract (%) | 10.0 | 9.7 | 13.7 | 13.1 | 12.6 | 12.1 | 11.7 |
| | Permanent set (%) | 55.0 | 61.9 | 36.1 | 43.0 | 49.9 | 56.9 | 63.8 |
| Cogged V-belt | Center distance variation (%) | | | | | | | |
| | Transmitted torque (Nm) | | | | | | | |
| | High-temp. durable life (hrs) | | | | | | | |
| | Low-temp. durable life (cycles) | | | | | | | |

TABLE 2-2-continued

|  | Formulation No. | 9 | 10 | 11 | 12 | 13 | 14 | 15 |
|---|---|---|---|---|---|---|---|---|
| Hybrid V-belt | Post-travel interference (mm) | | | | | | | |
|  | Transmitted torque (Nm) | | | | | | | |
|  | High-temp. durable life (hrs) | | | | | | | |
|  | Low-temp. durable life (cycles) | | | | | | | |

TABLE 2-3

|  | Formulation No. | 16 | 17 | 18 | 19 | 20 | 21 | 22 | 23 |
|---|---|---|---|---|---|---|---|---|---|
| Ingredients | EPDM | 35 | 35 | 35 | 35 | 35 | 35 | 35 | 35 |
|  | HNBR 1 | 65 | 65 | 65 | 65 | 65 | 65 | 65 | 65 |
|  | Zinc oxide | 10 | 10 | 10 | 10 | 10 | 10 | 10 | 10 |
|  | Antioxidant | 1 | 1 | 1 | 1 | 1 | 1 | 1 | 1 |
|  | Silica | 20 | 20 | 20 | 20 | 20 | 20 | 20 | 20 |
|  | Oil 1 | 10 | 10 | 10 | 10 | 10 | 15 | 15 | 15 |
|  | Oil 2 | 0 | 0 | 0 | 0 | 0 | 0 | 0 | 0 |
|  | Peroxide | 7 | 7 | 7 | 7 | 7 | 7 | 7 | 7 |
|  | Zinc dimethacrylate | 10 | 20 | 30 | 40 | 50 | 10 | 20 | 30 |
|  | Short nylon fibers | 10 | 10 | 10 | 10 | 10 | 10 | 10 | 10 |
|  | Short Technora fibers | 10 | 10 | 10 | 10 | 10 | 10 | 10 | 10 |
| Rubber properties | Rubber hardness | 34 | 40 | 44 | 54 | 67 | 32 | 37 | 42 |
|  | Gehman torsion $T_5$ (° C.) | -32.5 | -32.1 | -31.8 | -31.6 | -31.1 | -35.3 | -35.0 | -34.8 |
|  | Amount of acetone extract (%) | 8.7 | 8.4 | 8.1 | 7.8 | 7.5 | 11.2 | 10.8 | 10.4 |
|  | Permanent set (%) | 32.3 | 39.2 | 46.2 | 53.1 | 60.0 | 34.2 | 41.1 | 48.1 |
| Cogged V-belt | Center distance variation (%) |  | 2.4 | 2.4 | 2.3 |  |  |  |  |
|  | Transmitted torque (Nm) | 122 | 134 | 135 | 140 | 147 |  |  |  |
|  | High-temp. durable life (hrs) | 176 | 162 | 158 | 138 | 59 |  |  |  |
|  | Low-temp. durable life (cycles) |  | 20 | 18 | 15 |  |  |  |  |
| Hybrid V-belt | Post-travel interference (mm) |  | -0.25 | -0.23 | -0.23 |  |  |  |  |
|  | Transmitted torque (Nm) | 380 | 432 | 436 | 446 | 476 |  |  |  |
|  | High-temp. durable life (hrs) | 513 | 502 | 483 | 446 | 158 |  |  |  |
|  | Low-temp. durable life (cycles) |  | 25 | 22 | 20 |  |  |  |  |

TABLE 2-4

|  | Formulation No. | 24 | 25 | 26 | 27 | 28 | 29 | 30 |
|---|---|---|---|---|---|---|---|---|
| Ingredients | EPDM | 35 | 35 | 35 | 35 | 35 | 35 | 35 |
|  | HNBR 1 | 65 | 65 | 65 | 65 | 65 | 65 | 65 |
|  | Zinc oxide | 10 | 10 | 10 | 10 | 10 | 10 | 10 |
|  | Antioxidant | 1 | 1 | 1 | 1 | 1 | 1 | 1 |
|  | Silica | 20 | 20 | 20 | 20 | 20 | 20 | 20 |
|  | Oil 1 | 15 | 15 | 20 | 20 | 20 | 20 | 20 |
|  | Oil 2 | 0 | 0 | 0 | 0 | 0 | 0 | 0 |
|  | Peroxide | 7 | 7 | 7 | 7 | 7 | 7 | 7 |
|  | Zinc dimethacrylate | 40 | 50 | 10 | 20 | 30 | 40 | 50 |
|  | Short nylon fibers | 10 | 10 | 10 | 10 | 10 | 10 | 10 |
|  | Short Technora fibers | 10 | 10 | 10 | 10 | 10 | 10 | 10 |

TABLE 2-4-continued

|  | Formulation No. | 24 | 25 | 26 | 27 | 28 | 29 | 30 |
|---|---|---|---|---|---|---|---|---|
| Rubber properties | Rubber hardness | 54 | 61 | 31 | 36 | 41 | 49 | 61 |
|  | Gehman torsion $T_5$ (° C.) | −34.6 | −34.4 | −38.1 | −37.5 | −37.3 | −37.1 | −36.5 |
|  | Amount of acetone extract (%) | 10.0 | 9.7 | 13.7 | 13.1 | 12.6 | 12.1 | 11.7 |
|  | Permanent set (%) | 55.0 | 61.9 | 36.1 | 43.0 | 49.9 | 56.9 | 63.8 |
| Cogged V-belt | Center distance variation (%) |  |  |  |  |  |  |  |
|  | Transmitted torque (Nm) |  |  |  |  |  |  |  |
|  | High-temp. durable life (hrs) |  |  |  |  |  |  |  |
|  | Low-temp. durable life (cycles) |  |  |  |  |  |  |  |
| Hybrid V-belt | Post-travel interference (mm) |  |  |  |  |  |  |  |
|  | Transmitted torque (Nm) |  |  |  |  |  |  |  |
|  | High-temp. durable life (hrs) |  |  |  |  |  |  |  |
|  | Low-temp. durable life (cycles) |  |  |  |  |  |  |  |

TABLE 2-5

|  | Formulation No. | 31 | 32 | 33 | 34 | 35 | 36 | 37 | 38 |
|---|---|---|---|---|---|---|---|---|---|
| Ingredients | EPDM | 45 | 45 | 45 | 45 | 45 | 45 | 45 | 45 |
|  | HNBR 1 | 55 | 55 | 55 | 55 | 55 | 55 | 55 | 55 |
|  | Zinc oxide | 10 | 10 | 10 | 10 | 10 | 10 | 10 | 10 |
|  | Antioxidant | 1 | 1 | 1 | 1 | 1 | 1 | 1 | 1 |
|  | Silica | 20 | 20 | 20 | 20 | 20 | 20 | 20 | 20 |
|  | Oil 1 | 10 | 10 | 10 | 10 | 10 | 15 | 15 | 15 |
|  | Oil 2 | 0 | 0 | 0 | 0 | 0 | 0 | 0 | 0 |
|  | Peroxide | 7 | 7 | 7 | 7 | 7 | 7 | 7 | 7 |
|  | Zinc dimethacrylate | 10 | 20 | 30 | 40 | 50 | 10 | 20 | 30 |
|  | Short nylon fibers | 10 | 10 | 10 | 10 | 10 | 10 | 10 | 10 |
|  | Short Technora fibers | 10 | 10 | 10 | 10 | 10 | 10 | 10 | 10 |
| Rubber properties | Rubber hardness | 35 | 41 | 45 | 53 | 68 | 33 | 37 | 42 |
|  | Gehman torsion $T_5$ (° C.) | −34.2 | −34.1 | −33.7 | −33.4 | −33.2 | −37.0 | −36.6 | −36.4 |
|  | Amount of acetone extract (%) | 8.7 | 8.4 | 8.1 | 7.8 | 7.5 | 11.2 | 10.8 | 10.4 |
|  | Permanent set (%) | 32.3 | 39.2 | 46.2 | 53.1 | 60.0 | 34.2 | 41.1 | 48.1 |
| Cogged V-belt | Center distance variation (%) |  | 2.5 | 2.4 | 2.4 |  |  |  |  |
|  | Transmitted torque (Nm) | 120 | 134 | 136 | 139 | 148 |  |  |  |
|  | High-temp. durable life (hrs) | 175 | 162 | 154 | 135 | 53 |  |  |  |
|  | Low-temp. durable life (cycles) |  | 35 | 32 | 28 |  |  |  |  |
| Hybrid V-belt | Post-travel interference (mm) |  | −0.26 | −0.25 | −0.24 |  |  |  |  |
|  | Transmitted torque (Nm) | 380 | 432 | 436 | 446 | 475 |  |  |  |
|  | High-temp. durable life (hrs) | 501 | 489 | 473 | 443 | 155 |  |  |  |
|  | Low-temp. durable life (cycles) |  | 46 | 44 | 40 |  |  |  |  |

TABLE 2-6

| | Formulation No. | 39 | 40 | 41 | 42 | 43 | 44 | 45 |
|---|---|---|---|---|---|---|---|---|
| Ingredients | EPDM | 45 | 45 | 45 | 45 | 45 | 45 | 45 |
| | HNBR 1 | 55 | 55 | 55 | 55 | 55 | 55 | 55 |
| | Zinc oxide | 10 | 10 | 10 | 10 | 10 | 10 | 10 |
| | Antioxidant | 1 | 1 | 1 | 1 | 1 | 1 | 1 |
| | Silica | 20 | 20 | 20 | 20 | 20 | 20 | 20 |
| | Oil 1 | 15 | 15 | 20 | 20 | 20 | 20 | 20 |
| | Oil 2 | 0 | 0 | 0 | 0 | 0 | 0 | 0 |
| | Peroxide | 7 | 7 | 7 | 7 | 7 | 7 | 7 |
| | Zinc dimethacrylate | 40 | 50 | 10 | 20 | 30 | 40 | 50 |
| | Short nylon fibers | 10 | 10 | 10 | 10 | 10 | 10 | 10 |
| | Short Technora fibers | 10 | 10 | 10 | 10 | 10 | 10 | 10 |
| Rubber properties | Rubber hardness | 55 | 63 | 31 | 36 | 42 | 50 | 62 |
| | Gehman torsion $T_5$ (° C.) | −36.2 | −35.8 | −39.8 | −39.5 | −39.2 | −38.9 | −38.3 |
| | Amount of acetone extract (%) | 10.0 | 9.7 | 13.7 | 13.1 | 12.6 | 12.1 | 11.7 |
| | Permanent set (%) | 55.0 | 61.9 | 36.1 | 43.0 | 49.9 | 56.9 | 63.8 |
| Cogged V-belt | Center distance variation (%) | | | | | | | |
| | Transmitted torque (Nm) | | | | | | | |
| | High-temp. durable life (hrs) | | | | | | | |
| | Low-temp. durable life (cycles) | | | | | | | |
| Hybrid V-belt | Post-travel interference (mm) | | | | | | | |
| | Transmitted torque (Nm) | | | | | | | |
| | High-temp. durable life (hrs) | | | | | | | |
| | Low-temp. durable life (cycles) | | | | | | | |

TABLE 2-7

| | Formulation No. | 46 | 47 | 48 | 49 | 50 | 51 | 52 | 53 |
|---|---|---|---|---|---|---|---|---|---|
| Ingredients | EPDM | 55 | 55 | 55 | 55 | 55 | 55 | 55 | 55 |
| | HNBR 1 | 45 | 45 | 45 | 45 | 45 | 45 | 45 | 45 |
| | Zinc oxide | 10 | 10 | 10 | 10 | 10 | 10 | 10 | 10 |
| | Antioxidant | 1 | 1 | 1 | 1 | 1 | 1 | 1 | 1 |
| | Silica | 20 | 20 | 20 | 20 | 20 | 20 | 20 | 20 |
| | Oil 1 | 10 | 10 | 10 | 10 | 10 | 15 | 15 | 15 |
| | Oil 2 | 0 | 0 | 0 | 0 | 0 | 0 | 0 | 0 |
| | Peroxide | 7 | 7 | 7 | 7 | 7 | 7 | 7 | 7 |
| | Zinc dimethacrylate | 10 | 20 | 30 | 40 | 50 | 10 | 20 | 30 |
| | Short nylon fibers | 10 | 10 | 10 | 10 | 10 | 10 | 10 | 10 |
| | Short Technora fibers | 10 | 10 | 10 | 10 | 10 | 10 | 10 | 10 |
| Rubber properties | Rubber hardness | 34 | 40 | 45 | 55 | 67 | 32 | 37 | 42 |
| | Gehman torsion $T_5$ (° C.) | −36.0 | −35.6 | −35.3 | −35.1 | −34.6 | −38.7 | −38.4 | −38.2 |
| | Amount of acetone extract (%) | 8.7 | 8.4 | 8.1 | 7.8 | 7.5 | 11.2 | 10.8 | 10.4 |
| | Permanent set (%) | 32.3 | 39.2 | 46.2 | 53.1 | 60.0 | 34.2 | 41.1 | 48.1 |
| Cogged V-belt | Center distance variation (%) | | 2.5 | 2.5 | 2.3 | | | | 3.5 |
| | Transmitted torque (Nm) | 121 | 134 | 137 | 141 | 148 | | | |
| | High-temp. durable life (hrs) | 165 | 153 | 139 | 131 | 50 | | | |
| | Low-temp. durable life (cycles) | | 65 | 63 | 60 | | | | ≧100 |

TABLE 2-7-continued

| | Formulation No. | 46 | 47 | 48 | 49 | 50 | 51 | 52 | 53 |
|---|---|---|---|---|---|---|---|---|---|
| Hybrid V-belt | Post-travel interference (mm) | | −0.25 | −0.24 | −0.23 | | | | −0.35 |
| | Transmitted torque (Nm) | 385 | 432 | 435 | 449 | 470 | | | |
| | High-temp. durable life (hrs) | 481 | 465 | 452 | 435 | 135 | | | |
| | Low-temp. durable life (cycles) | | 81 | 80 | 78 | | | | ≧100 |

TABLE 2-8

| | Formulation No. | 54 | 55 | 56 | 57 | 58 | 59 | 60 |
|---|---|---|---|---|---|---|---|---|
| Ingredients | EPDM | 55 | 55 | 55 | 55 | 55 | 55 | 55 |
| | HNBR 1 | 45 | 45 | 45 | 45 | 45 | 45 | 45 |
| | Zinc oxide | 10 | 10 | 10 | 10 | 10 | 10 | 10 |
| | Antioxidant | 1 | 1 | 1 | 1 | 1 | 1 | 1 |
| | Silica | 20 | 20 | 20 | 20 | 20 | 20 | 20 |
| | Oil 1 | 15 | 15 | 20 | 20 | 20 | 20 | 20 |
| | Oil 2 | 0 | 0 | 0 | 0 | 0 | 0 | 0 |
| | Peroxide | 7 | 7 | 7 | 7 | 7 | 7 | 7 |
| | Zinc dimethacrylate | 40 | 50 | 10 | 20 | 30 | 40 | 50 |
| | Short nylon fibers | 10 | 10 | 10 | 10 | 10 | 10 | 10 |
| | Short Technora fibers | 10 | 10 | 10 | 10 | 10 | 10 | 10 |
| Rubber properties | Rubber hardness | 53 | 61 | 32 | 37 | 42 | 49 | 61 |
| | Gehman torsion $T_5$ (° C.) | −38.0 | −37.8 | −41.5 | −40.9 | −40.7 | −40.5 | −39.9 |
| | Amount of acetone extract (%) | 10.0 | 9.7 | 13.7 | 13.1 | 12.6 | 12.1 | 11.7 |
| | Permanent set (%) | 55.0 | 61.9 | 36.1 | 43.0 | 49.9 | 56.9 | 63.8 |
| Cogged V-belt | Center distance variation (%) | 3.4 | | | | 4.1 | 3.9 | |
| | Transmitted torque (Nm) | | | | | | | |
| | High-temp. durable life (hrs) | | | | | | | |
| | Low-temp. durable life (cycles) | ≧100 | | | | ≧100 | ≧100 | |
| Hybrid V-belt | Post-travel interference (mm) | −0.33 | | | | −0.39 | −0.37 | |
| | Transmitted torque (Nm) | | | | | | | |
| | High-temp. durable life (hrs) | | | | | | | |
| | Low-temp. durable life (cycles) | ≧100 | | | | ≧100 | ≧100 | |

TABLE 2-9

| | Formulation No. | 61 | 62 | 63 | 64 | 65 | 66 | 67 | 68 |
|---|---|---|---|---|---|---|---|---|---|
| Ingredients | EPDM | 65 | 65 | 65 | 65 | 65 | 65 | 65 | 65 |
| | HNBR 1 | 35 | 35 | 35 | 35 | 35 | 35 | 35 | 35 |
| | Zinc oxide | 10 | 10 | 10 | 10 | 10 | 10 | 10 | 10 |
| | Antioxidant | 1 | 1 | 1 | 1 | 1 | 1 | 1 | 1 |
| | Silica | 20 | 20 | 20 | 20 | 20 | 20 | 20 | 20 |
| | Oil 1 | 5 | 5 | 5 | 5 | 5 | 10 | 10 | 10 |
| | Oil 2 | 0 | 0 | 0 | 0 | 0 | 0 | 0 | 0 |
| | Peroxide | 7 | 7 | 7 | 7 | 7 | 7 | 7 | 7 |
| | Zinc dimethacrylate | 10 | 20 | 30 | 40 | 50 | 10 | 20 | 30 |
| | Short nylon fibers | 10 | 10 | 10 | 10 | 10 | 10 | 10 | 10 |
| | Short Technora fibers | 10 | 10 | 10 | 10 | 10 | 10 | 10 | 10 |

TABLE 2-9-continued

| | Formulation No. | 61 | 62 | 63 | 64 | 65 | 66 | 67 | 68 |
|---|---|---|---|---|---|---|---|---|---|
| Rubber properties | Rubber hardness | 35 | 41 | 47 | 57 | 70 | 33 | 40 | 45 |
| | Gehman torsion $T_5$ (° C.) | −35.9 | −35.5 | −35.3 | −35.1 | −34.7 | −37.7 | −37.4 | −37.1 |
| | Amount of acetone extract (%) | 6.0 | 5.8 | 5.6 | 5.5 | 5.3 | 8.7 | 8.4 | 8.1 |
| | Permanent set (%) | 30.4 | 37.3 | 44.3 | 51.2 | 58.1 | 32.3 | 39.2 | 46.2 |
| Cogged V-belt | Center distance variation (%) | | 1.9 | 1.8 | 1.6 | | | 2.4 | 2.3 |
| | Transmitted torque (Nm) | 119 | 134 | 137 | 142 | 151 | | | |
| | High-temp. durable life (hrs) | 150 | 141 | 130 | 124 | 39 | | | |
| | Low-temp. durable life (cycles) | | 55 | 53 | 51 | | | ≧100 | ≧100 |
| Hybrid V-belt | Post-travel interference (mm) | | −0.15 | −0.14 | −0.14 | | | −0.25 | −0.24 |
| | Transmitted torque (Nm) | 390 | 432 | 439 | 458 | 482 | | | |
| | High-temp. durable life (hrs) | 451 | 432 | 406 | 380 | 130 | | | |
| | Low-temp. durable life (cycles) | | 75 | 73 | 72 | | | ≧100 | ≧100 |

TABLE 2-10

| | Formulation No. | 69 | 70 | 71 | 72 | 73 | 74 | 75 |
|---|---|---|---|---|---|---|---|---|
| Ingredients | EPDM | 65 | 65 | 65 | 65 | 65 | 65 | 65 |
| | HNBR 1 | 35 | 35 | 35 | 35 | 35 | 35 | 35 |
| | Zinc oxide | 10 | 10 | 10 | 10 | 10 | 10 | 10 |
| | Antioxidant | 1 | 1 | 1 | 1 | 1 | 1 | 1 |
| | Silica | 20 | 20 | 20 | 20 | 20 | 20 | 20 |
| | Oil 1 | 10 | 10 | 15 | 15 | 15 | 15 | 15 |
| | Oil 2 | 0 | 0 | 0 | 0 | 0 | 0 | 0 |
| | Peroxide | 7 | 7 | 7 | 7 | 7 | 7 | 7 |
| | Zinc dimethacrylate | 40 | 50 | 10 | 20 | 30 | 40 | 50 |
| | Short nylon fibers | 10 | 10 | 10 | 10 | 10 | 10 | 10 |
| | Short Technora fibers | 10 | 10 | 10 | 10 | 10 | 10 | 10 |
| Rubber properties | Rubber hardness | 53 | 64 | 32 | 35 | 41 | 49 | 62 |
| | Gehman torsion $T_5$ (° C.) | −36.8 | −36.2 | −40.4 | −40.1 | −39.8 | −39.5 | −38.9 |
| | Amount of acetone extract (%) | 7.8 | 7.5 | 11.2 | 10.8 | 10.4 | 10.0 | 9.7 |
| | Permanent set (%) | 53.1 | 60.0 | 34.2 | 41.1 | 48.1 | 55.0 | 61.9 |
| Cogged V-belt | Center distance variation (%) | 2.2 | | | | 3.4 | 3.3 | |
| | Transmitted torque (Nm) | | | | | | | |
| | High-temp. durable life (hrs) | | | | | | | |
| | Low-temp. durable life (cycles) | ≧100 | | | ≧100 | ≧100 | | |
| Hybrid V-belt | Post-travel interference (mm) | −0.22 | | | | −0.32 | −0.31 | |
| | Transmitted torque (Nm) | | | | | | | |
| | High-temp. durable life (hrs) | | | | | | | |
| | Low-temp. durable life (cycles) | ≧100 | | | ≧100 | ≧100 | | |

TABLE 2-11

| | | Formulation No. | | | | | | | |
|---|---|---|---|---|---|---|---|---|---|
| | | 76 | 77 | 78 | 79 | 80 | 81 | 82 | 83 |
| Ingredients | EPDM | 75 | 75 | 75 | 75 | 75 | 75 | 75 | 75 |
| | HNBR 1 | 25 | 25 | 25 | 25 | 25 | 25 | 25 | 25 |
| | Zinc oxide | 10 | 10 | 10 | 10 | 10 | 10 | 10 | 10 |
| | Antioxidant | 1 | 1 | 1 | 1 | 1 | 1 | 1 | 1 |
| | Silica | 20 | 20 | 20 | 20 | 20 | 20 | 20 | 20 |
| | Oil 1 | 5 | 5 | 5 | 5 | 5 | 10 | 10 | 10 |
| | Oil 2 | 0 | 0 | 0 | 0 | 0 | 0 | 0 | 0 |
| | Peroxide | 7 | 7 | 7 | 7 | 7 | 7 | 7 | 7 |
| | Zinc dimethacrylate | 10 | 20 | 30 | 40 | 50 | 10 | 20 | 30 |
| | Short nylon fibers | 10 | 10 | 10 | 10 | 10 | 10 | 10 | 10 |
| | Short Technora fibers | 10 | 10 | 10 | 10 | 10 | 10 | 10 | 10 |
| Rubber properties | Rubber hardness | 35 | 41 | 45 | 58 | 69 | 34 | 40 | 42 |
| | Gehman torsion $T_5$ (° C.) | −36.6 | −36.2 | −35.9 | −35.7 | −35.2 | −39.4 | −39.1 | −38.9 |
| | Amount of acetone extract (%) | 6.0 | 5.8 | 5.6 | 5.5 | 5.3 | 8.7 | 8.4 | 8.1 |
| | Permanent set (%) | 30.4 | 37.3 | 44.3 | 51.2 | 58.1 | 32.3 | 39.2 | 46.2 |
| Cogged V-belt | Center distance variation (%) | | 1.9 | 1.8 | 1.8 | | | 2.6 | 2.5 |
| | Transmitted torque (Nm) | 121 | 133 | 134 | 141 | 148 | | | |
| | High-temp. durable life (hrs) | 140 | 131 | 127 | 116 | 39 | | | |
| | Low-temp. durable life (cycles) | | 71 | 70 | 68 | | ≧100 | | ≧100 |
| Hybrid V-belt | Post-travel interference (mm) | | −0.14 | −0.13 | −0.12 | | | −0.26 | −0.24 |
| | Transmitted torque (Nm) | 389 | 431 | 435 | 457 | 479 | | | |
| | High-temp. durable life (hrs) | 400 | 393 | 375 | 356 | 145 | | | |
| | Low-temp. durable life (cycles) | | 89 | 87 | 85 | | ≧100 | | ≧100 |

TABLE 2-12

| | | Formulation No. | | | | | | |
|---|---|---|---|---|---|---|---|---|
| | | 84 | 85 | 86 | 87 | 88 | 89 | 90 |
| Ingredients | EPDM | 75 | 75 | 75 | 75 | 75 | 75 | 75 |
| | HNBR 1 | 25 | 25 | 25 | 25 | 25 | 25 | 25 |
| | Zinc oxide | 10 | 10 | 10 | 10 | 10 | 10 | 10 |
| | Antioxidant | 1 | 1 | 1 | 1 | 1 | 1 | 1 |
| | Silica | 20 | 20 | 20 | 20 | 20 | 20 | 20 |
| | Oil 1 | 10 | 10 | 15 | 15 | 15 | 15 | 15 |
| | Oil 2 | 0 | 0 | 0 | 0 | 0 | 0 | 0 |
| | Peroxide | 7 | 7 | 7 | 7 | 7 | 7 | 7 |
| | Zinc dimethacrylate | 40 | 50 | 10 | 20 | 30 | 40 | 50 |
| | Short nylon fibers | 10 | 10 | 10 | 10 | 10 | 10 | 10 |
| | Short Technora fibers | 10 | 10 | 10 | 10 | 10 | 10 | 10 |
| Rubber properties | Rubber hardness | 54 | 62 | 32 | 35 | 42 | 50 | 62 |
| | Gehman torsion $T_5$ (° C.) | −38.7 | −38.5 | −42.2 | −41.6 | −41.4 | −41.2 | −40.6 |
| | Amount of acetone extract (%) | 7.8 | 7.5 | 11.2 | 10.8 | 10.4 | 10.1 | 9.7 |
| | Permanent set (%) | 53.1 | 60.0 | 34.2 | 41.1 | 48.1 | 55.0 | 61.9 |
| Cogged V-belt | Center distance variation (%) | 2.5 | | | | 3.5 | 3.4 | |
| | Transmitted torque (Nm) | | | | | | | |
| | High-temp. durable life (hrs) | | | | | | | |
| | Low-temp. durable life (cycles) | ≧100 | | | | ≧100 | ≧100 | |

TABLE 2-12-continued

|  |  | Formulation No. | | | | | | |
| --- | --- | --- | --- | --- | --- | --- | --- | --- |
|  |  | 84 | 85 | 86 | 87 | 88 | 89 | 90 |
| Hybrid V-belt | Post-travel interference (mm) | −0.23 |  |  |  | −0.36 | −0.34 |  |
|  | Transmitted torque (Nm) |  |  |  |  |  |  |  |
|  | High-temp. durable life (hrs) |  |  |  |  |  |  |  |
|  | Low-temp. durable life (cycles) | ≧100 |  |  |  | ≧100 | ≧100 |  |

TABLE 2-13

|  |  | Formulation No. | | | | | | | |
| --- | --- | --- | --- | --- | --- | --- | --- | --- | --- |
|  |  | 91 | 92 | 93 | 94 | 95 | 96 | 97 | 98 |
| Ingredients | EPDM | 80 | 80 | 80 | 80 | 80 | 80 | 80 | 80 |
|  | HNBR 1 | 20 | 20 | 20 | 20 | 20 | 20 | 20 | 20 |
|  | Zinc oxide | 10 | 10 | 10 | 10 | 10 | 10 | 10 | 10 |
|  | Antioxidant | 1 | 1 | 1 | 1 | 1 | 1 | 1 | 1 |
|  | Silica | 20 | 20 | 20 | 20 | 20 | 20 | 20 | 20 |
|  | Oil 1 | 0 | 0 | 0 | 0 | 0 | 0 | 0 | 0 |
|  | Oil 2 | 0 | 0 | 0 | 0 | 0 | 5 | 5 | 5 |
|  | Peroxide | 7 | 7 | 7 | 7 | 7 | 7 | 7 | 7 |
|  | Zinc dimethacrylate | 10 | 20 | 30 | 40 | 50 | 10 | 20 | 30 |
|  | Short nylon fibers | 10 | 10 | 10 | 10 | 10 | 10 | 10 | 10 |
|  | Short Technora fibers | 10 | 10 | 10 | 10 | 10 | 10 | 10 | 10 |
| Rubber properties | Rubber hardness | 35 | 41 | 48 | 56 | 69 | 34 | 37 | 42 |
|  | Gehman torsion $T_5$ (° C.) | −40.0 | −39.4 | −39.2 | −39.1 | −38.9 | −43.2 | −42.8 | −42.5 |
|  | Amount of acetone extract (%) | 3.1 | 3.1 | 3.0 | 3.0 | 3.0 | 6.0 | 5.8 | 5.6 |
|  | Permanent set (%) | 28.5 | 35.4 | 42.4 | 49.3 | 56.2 | 30.4 | 37.3 | 44.3 |
| Cogged V-belt | Center distance variation (%) |  | 1.5 | 1.4 | 1.3 |  |  |  |  |
|  | Transmitted torque (Nm) | 115 | 133 | 137 | 141 | 149 |  |  |  |
|  | High-temp. durable life (hrs) | 95 | 90 | 83 | 80 | 25 |  |  |  |
|  | Low-temp. durable life (cycles) |  | ≧100 | ≧100 | ≧100 |  |  |  |  |
| Hybrid V-belt | Post-travel interference (mm) |  | −0.1 | −0.09 | −0.09 |  |  |  |  |
|  | Transmitted torque (Nm) | 386 | 432 | 438 | 452 | 481 |  |  |  |
|  | High-temp. durable life (hrs) | 302 | 293 | 271 | 255 | 75 |  |  |  |
|  | Low-temp. durable life (cycles) |  | ≧100 | ≧100 | ≧100 |  |  |  |  |

TABLE 2-14

|  |  | Formulation No. | | | | | | |
| --- | --- | --- | --- | --- | --- | --- | --- | --- |
|  |  | 99 | 100 | 101 | 102 | 103 | 104 | 105 |
| Ingredients | EPDM | 80 | 80 | 80 | 80 | 80 | 80 | 80 |
|  | HNBR 1 | 20 | 20 | 20 | 20 | 20 | 20 | 20 |
|  | Zinc oxide | 10 | 10 | 10 | 10 | 10 | 10 | 10 |
|  | Antioxidant | 1 | 1 | 1 | 1 | 1 | 1 | 1 |
|  | Silica | 20 | 20 | 20 | 20 | 20 | 20 | 20 |
|  | Oil 1 | 0 | 0 | 0 | 0 | 0 | 0 | 0 |
|  | Oil 2 | 5 | 5 | 10 | 10 | 10 | 10 | 10 |

TABLE 2-14-continued

|  |  | Formulation No. | | | | | | |
|---|---|---|---|---|---|---|---|---|
|  |  | 99 | 100 | 101 | 102 | 103 | 104 | 105 |
|  | Peroxide | 7 | 7 | 7 | 7 | 7 | 7 | 7 |
|  | Zinc dimethacrylate | 40 | 50 | 10 | 20 | 30 | 40 | 50 |
|  | Short nylon fibers | 10 | 10 | 10 | 10 | 10 | 10 | 10 |
|  | Short Technora fibers | 10 | 10 | 10 | 10 | 10 | 10 | 10 |
| Rubber properties | Rubber hardness | 55 | 65 | 33 | 37 | 43 | 48 | 63 |
|  | Gehman torsion $T_5$ (° C.) | −42.3 | −42.1 | −46.3 | −45.7 | −45.5 | −45.4 | −45.2 |
|  | Amount of acetone extract (%) | 5.5 | 5.3 | 8.7 | 8.4 | 8.1 | 7.8 | 7.5 |
|  | Permanent set (%) | 51.2 | 58.1 | 32.3 | 39.2 | 46.2 | 53.1 | 60.0 |
| Cogged V-belt | Center distance variation (%) |  |  |  |  |  |  |  |
|  | Transmitted torque (Nm) |  |  |  |  |  |  |  |
|  | High-temp. durable life (hrs) |  |  |  |  |  |  |  |
|  | Low-temp. durable life (cycles) |  |  |  |  |  |  |  |
| Hybrid V-belt | Post-travel interference (mm) |  |  |  |  |  |  |  |
|  | Transmitted torque (Nm) |  |  |  |  |  |  |  |
|  | High-temp. durable life (hrs) |  |  |  |  |  |  |  |
|  | Low-temp. durable life (cycles) |  |  |  |  |  |  |  |

TABLE 2-15

|  |  | Formulation No. | | | | | | | |
|---|---|---|---|---|---|---|---|---|---|
|  |  | 106 | 107 | 108 | 109 | 110 | 111 | 112 | 113 |
| Ingredients | EPDM | 100 | 100 | 100 | 100 | 100 | 100 | 100 | 100 |
|  | HNBR 1 | 0 | 0 | 0 | 0 | 0 | 0 | 0 | 0 |
|  | Zinc oxide | 10 | 10 | 10 | 10 | 10 | 10 | 10 | 10 |
|  | Antioxidant | 1 | 1 | 1 | 1 | 1 | 1 | 1 | 1 |
|  | Silica | 20 | 20 | 20 | 20 | 20 | 20 | 20 | 20 |
|  | Oil 1 | 0 | 0 | 0 | 0 | 0 | 0 | 0 | 0 |
|  | Oil 2 | 0 | 0 | 0 | 0 | 0 | 5 | 5 | 5 |
|  | Peroxide | 7 | 7 | 7 | 7 | 7 | 7 | 7 | 7 |
|  | Zinc dimethacrylate | 10 | 20 | 30 | 40 | 50 | 10 | 20 | 30 |
|  | Short nylon fibers | 10 | 10 | 10 | 10 | 10 | 10 | 10 | 10 |
|  | Short Technora fibers | 10 | 10 | 10 | 10 | 10 | 10 | 10 | 10 |
| Rubber properties | Rubber hardness | 34 | 41 | 47 | 58 | 65 | 33 | 38 | 42 |
|  | Gehman torsion $T_5$ (° C.) | −42.7 | −42.2 | −41.9 | −41.7 | −41.4 | −45.8 | −45.5 | −45.3 |
|  | Amount of acetone extract (%) | 3.1 | 3.1 | 3.0 | 3.0 | 3.0 | 6.0 | 5.8 | 5.6 |
|  | Permanent set (%) | 28.5 | 35.4 | 42.4 | 49.3 | 56.2 | 30.4 | 37.3 | 44.3 |
| Cogged V-belt | Center distance variation (%) |  | 1.6 | 1.6 | 1.4 |  |  |  |  |
|  | Transmitted torque (Nm) | 110 | 130 | 136 | 142 | 147 |  |  |  |
|  | High-temp. durable life (hrs) | 93 | 90 | 86 | 79 | 33 |  |  |  |
|  | Low-temp. durable life (cycles) |  | ≧100 | ≧100 | ≧100 |  |  |  |  |
| Hybrid V-belt | Post-travel interference (mm) |  | −0.11 | −0.1 | −0.1 |  |  |  |  |
|  | Transmitted torque (Nm) | 385 | 432 | 437 | 455 | 471 |  |  |  |
|  | High-temp. durable life (hrs) | 270 | 254 | 235 | 226 | 76 |  |  |  |
|  | Low-temp. durable life (cycles) |  | ≧100 | ≧100 | ≧100 |  |  |  |  |

TABLE 2-16

|  |  | Formulation No. | | | | | | |
|---|---|---|---|---|---|---|---|---|
|  |  | 114 | 115 | 116 | 117 | 118 | 119 | 120 |
| Ingredients | EPDM | 100 | 100 | 100 | 100 | 100 | 100 | 100 |
|  | HNBR 1 | 0 | 0 | 0 | 0 | 0 | 0 | 0 |
|  | Zinc oxide | 10 | 10 | 10 | 10 | 10 | 10 | 10 |
|  | Antioxidant | 1 | 1 | 1 | 1 | 1 | 1 | 1 |
|  | Silica | 20 | 20 | 20 | 20 | 20 | 20 | 20 |
|  | Oil 1 | 0 | 0 | 0 | 0 | 0 | 0 | 0 |
|  | Oil 2 | 5 | 5 | 10 | 10 | 10 | 10 | 10 |
|  | Peroxide | 7 | 7 | 7 | 7 | 7 | 7 | 7 |
|  | Zinc dimethacrylate | 40 | 50 | 10 | 20 | 30 | 40 | 50 |
|  | Short nylon fibers | 10 | 10 | 10 | 10 | 10 | 10 | 10 |
|  | Short Technora fibers | 10 | 10 | 10 | 10 | 10 | 10 | 10 |
| Rubber properties | Rubber hardness | 54 | 64 | 33 | 37 | 41 | 50 | 62 |
|  | Gehman torsion $T_5$ (° C.) | −45.0 | −44.5 | −49.0 | −48.7 | −48.3 | −48.1 | −47.7 |
|  | Amount of acetone extract (%) | 5.5 | 5.3 | 8.7 | 8.4 | 8.1 | 7.8 | 7.5 |
|  | Permanent set (%) | 51.2 | 58.1 | 32.3 | 39.2 | 46.2 | 53.1 | 60.0 |
| Cogged V-belt | Center distance variation (%) |  |  |  |  |  |  |  |
|  | Transmitted torque (Nm) |  |  |  |  |  |  |  |
|  | High-temp. durable life (hrs) |  |  |  |  |  |  |  |
|  | Low-temp. durable life (cycles) |  |  |  |  | ≧100 | ≧100 |  |
| Hybrid V-belt | Post-travel interference (mm) |  |  |  |  |  |  |  |
|  | Transmitted torque (Nm) |  |  |  |  |  |  |  |
|  | High-temp. durable life (hrs) |  |  |  |  |  |  |  |
|  | Low-temp. durable life (cycles) |  |  |  |  | ≧100 | ≧100 |  |

Tables 2-1 and 2-2 (Formulation No. 1–15) show the data where the ratio of EPDM to hydrogenated acrylonitrile butadiene rubber HNBR 1 (Zetpol 2010) is fixed at 25/75 and the amounts of oil and zinc dimethacrylate are changed. Likewise, Tables 2-3 and 2-4 (Formulation No. 16–30) show the data where the ratio of EPDM to HNBR 1 is fixed at 35/65 and the amount of oil and the amount of zinc dimethacrylate are changed, Tables 2-5 and 2-6 (Formulation No. 31–45) where the ratio of EPDM to HNBR 1 is fixed at 45/55 and the amount of oil and the amount of zinc dimethacrylate are changed,. Tables 2-7 and 2-8 (Formulation No. 46–60) where the ratio of EPDM to HNBR 1 is fixed at 55/45 and the amount of oil and the amount of zinc dimethacrylate are changed, Tables 2-9 and 2-10 (Formulation No. 61–75) where the ratio of EPDM to HNBR 1 is fixed at 65/35 and the amount of oil and the amount of zinc dimethacrylate are changed, Tables 2-11 and 2-12 (Formulation No. 76–90) where the ratio of EPDM to HNBR 1 is fixed at 75/25 and the amount of oil and the amount of zinc dimethacrylate are changed, Tables 2-13 and 2-14 (Formulation No. 91–105) where the ratio of EPDM to HNBR 1 is fixed at 80/20 and the amount of oil and the amount of zinc dimethacrylate are changed, and Tables 2-15 and 2-16 (Formulation No. 106–120) where the ratio of EPDM to HNBR 1 is fixed at 100/0 and the amount of oil and the amount of zinc dimethacrylate are changed.

HNBR 1 shown in Tables 2-1 to 2-16 is hydrogenated acrylonitrile butadiene rubber containing 36% bound acrylonitrile. On the other hand, Tables 3-1 and 3-2 show the data using hydrogenated acrylonitrile butadiene rubber HNBR 2 (Zetpol 4110) containing 17% bound acrylonitrile. In Tables 3-1 and 3-2, the ratio of EPDM to HNBR 2 is changed from 55/45 to 65/35 and then 75/25, and the amount of oil and the amount of zinc dimethacrylate are changed for each rubber ratio.

TABLE 3-1

|  |  | Formulation No. | | | | |
|---|---|---|---|---|---|---|
|  |  | 121 | 122 | 123 | 124 | 125 |
| Ingredients | EPDM | 55 | 55 | 55 | 65 | 65 |
|  | HNBR 2 | 45 | 45 | 45 | 35 | 35 |
|  | Zinc oxide | 10 | 10 | 10 | 10 | 10 |
|  | Antioxidant | 1 | 1 | 1 | 1 | 1 |
|  | Silica | 20 | 20 | 20 | 20 | 20 |
|  | Oil 1 | 0 | 5 | 10 | 0 | 5 |

TABLE 3-1-continued

|  |  | Formulation No. | | | | |
| --- | --- | --- | --- | --- | --- | --- |
|  |  | 121 | 122 | 123 | 124 | 125 |
|  | Oil 2 | 0 | 0 | 0 | 0 | 0 |
|  | Peroxide | 7 | 7 | 7 | 7 | 7 |
|  | Zinc dimethacrylate | 30 | 30 | 30 | 30 | 30 |
|  | Short nylon fibers | 10 | 10 | 10 | 10 | 10 |
|  | Short aramid fibers | 10 | 10 | 10 | 10 | 10 |
| Rubber | Rubber hardness | 46 | 43 | 41 | 46 | 43 |
| properties | Gehman torsion $T_5$ (° C.) | −36.0 | −39.0 | −42.3 | −37.3 | −40.3 |
|  | Amount of acetone extract (%) | 3.0 | 5.6 | 8.1 | 3.0 | 5.6 |
| Cogged | Center distance variation (%) | 1.3 | 1.7 | 2.6 | 1.2 | 1.7 |
| V-belt | Transmitted torque (Nm) | 137 | 137 | 135 | 138 | 136 |
|  | High-temp. durable life (hrs) | 142 | 132 | 125 | 148 | 142 |
|  | Low-temp. durable life (cycles) | 75 | ≧100 | ≧100 | ≧100 | ≧100 |
|  | High-temp. durable life: fine dispersion (hrs) | 165 |  |  | 172 |  |
| Hybrid | Post-travel interference (mm) | −0.09 | −0.15 | −0.24 | −0.09 | −0.14 |
| V-belt | Transmitted torque (Nm) | 440 | 435 | 430 | 441 | 437 |
|  | High-temp. durable life (hrs) | 480 | 432 | 422 | 485 | 446 |
|  | Low-temp. durable life (cycles) | 92 | ≧100 | ≧100 | ≧100 | ≧100 |
|  | High-temp. durable life: fine dispersion (hrs) | 585 |  |  | 602 |  |

TABLE 3-2

|  |  | Formulation No. | | | |
| --- | --- | --- | --- | --- | --- |
|  |  | 126 | 127 | 128 | 129 |
| Ingredients | EPDM | 65 | 75 | 75 | 75 |
|  | HNBR 2 | 35 | 25 | 25 | 25 |
|  | Zinc oxide | 10 | 10 | 10 | 10 |
|  | Antioxidant | 1 | 1 | 1 | 1 |
|  | Silica | 20 | 20 | 20 | 20 |
|  | Oil 1 | 10 | 0 | 0 | 0 |
|  | Oil 2 | 0 | 0 | 5 | 10 |
|  | Peroxide | 7 | 7 | 7 | 7 |
|  | Zinc dimethacrylate | 30 | 30 | 30 | 30 |
|  | Short nylon fibers | 10 | 10 | 10 | 10 |
|  | Short aramid fibers | 10 | 10 | 10 | 10 |
| Rubber | Rubber hardness | 41 | 46 | 43 | 42 |
| properties | Gehman torsion $T_5$ (° C.) | −43.6 | −38.7 | −41.7 | −44.8 |
|  | Amount of acetone extract (%) | 8.1 | 3.0 | 5.6 | 8.1 |
| Cogged | Center distance variation (%) | 2.5 | 1.2 | 1.8 | 2.7 |
| V-belt | Transmitted torque (Nm) | 135 | 137 | 135 | 134 |
|  | High-temp. durable life (hrs) | 138 | 145 | 138 | 131 |
|  | Low-temp. durable life (cycles) | ≧100 | ≧100 | ≧100 | ≧100 |
|  | High-temp. durable life: fine dispersion (hrs) |  | 161 |  |  |
| Hybrid | Post-travel interference (mm) | −0.26 | −0.08 | −0.16 | −0.27 |
| V-belt | Transmitted torque (Nm) | 432 | 439 | 434 | 429 |
|  | High-temp. durable life (hrs) | 436 | 475 | 438 | 431 |
|  | Low-temp. durable life (cycles) | ≧100 | ≧100 | ≧100 | ≧100 |
|  | High-temp. durable life: fine dispersion (hrs) |  | 575 |  |  |

For the compounding of the rubber composition of formulations shown in Tables 2-1 to 3-2, a Banbury mixer is used. More specifically, two types of rubbers, EPDM and HNBR, and zinc dimethacrylate were concurrently put into the mixer for mastication, and then an antioxidant, zinc oxide, a filler, oil, a crosslinker (peroxide) and short fibers were sequentially put into the mixer and mixed into a compound.

The resultant rubber compounds were evaluated for the later-described rubber properties. Further, the typical rubber compounds in Tables 2-1 to 3-2 were used to fabricate cogged V-belts and tension members for hybrid V-belts, and the resultant belts were evaluated in the later-described manners.

In Tables 3-1 and 3-2, "High-temp. durable life: fine dispersion (hrs)" shows the data where a different compounding method from the above-described was employed.

More specifically, zinc dimethacrylate powders were fine milled to several μm particles, and coarse particles of 20 μm or more were classified by an air classifier and removed. Next, HNBR was wrapped around a roll mill with the surface temperature at 120° C., and the fine milled zinc dimethacrylate powders were added thereto by an amount corresponding to each rubber formulation and mixed to prepare hydrogenated acrylonitrile butadiene rubber dispersed with zinc dimethacrylate.

The HNBR containing the zinc dimethacrylate and EPDM were put into a Banbury mixer for mastication, and then an antioxidant, zinc oxide, a filler, oil, a crosslinker (peroxide) and short fibers were sequentially put into the mixer and mixed into a compound.

<Measurements of Rubber Properties> a) Measurement of Rubber Hardness

The mixed rubber compound was formed into a sheet of approximately 2.2 mm thickness using a roll mill, and then press molded at 170° C. for 20 minutes to prepare a crosslinked sheet of 2 mm thickness. Three plies of the rubber sheets were measured for rubber hardness by a durometer Type D in conformity with JIS K6253.

b) Measurement of Gehman Torsion Level $t_5$

Each sample of the rubber compounds was measured for $t_5$ (the temperature when its torsional stiffness has a value five times as large as that at 23° C.) by a Gehman torsion tester in conformity with JIS K6261. At that time, the sample was a 3 mm-wide strip in which the orientation of short fibers was orthogonal to the length of the strip.

c) Measurement of Amount of Acetone Extract

The crosslinked rubber sheet was sliced to a thickness of 0.5 mm or less, and measured for the amount of acetone extract using a Type I extractor in conformity with a JIS K6229 A method.

<Belt Evaluation> a) High-Temperature Durability Test on Cogged V-belts

The resultant belt was subjected to a durability test in a two-axis layout. The diameters of the drive and driven pulleys were 128 mm and 105 mm, respectively. An axial load (DW) of 120 kg (1176 N) was applied to the driven pulley. The drive pulley was rotated at 6000 rpm with a load of 44 Nm applied to the driven pulley.

First, the belt was run for 24 hours with the atmospheric temperature during travel kept at 130° C., and removed from the tester. The removed belt was measured for center distance to obtain a change in length. Specifically, the difference between the center distance before travel and that after 24 hours travel was divided by the center distance before travel to obtain a center distance variation on a percentage basis.

Then, the atmospheric temperature was decreased to 100° C., and the running test was continued by continuing to run the belt until any cog cracked. The period of time during which the belt continued to travel at 100° C. was defined as a high-temperature durable life.

In addition, belts using typical rubber formulations were measured for lateral surface temperature in travel 24 hours after the start of travel at 100° C. by an infrared non-contact temperature sensor.

b) Low-temperature Durability Test on Cogged V-belts

The resultant belt was subjected to a durability test in a two-axis layout. The diameters of the drive and driven pulleys were 68 mm and 158 mm, respectively. An axial load (DW) of 120 kg (1176 N) was applied to the driven pulley. The drive pulley was rotated at 1000 rpm with a load of 44 Nm applied to the driven pulley. A cycle was repeated in which the atmospheric temperature was set at −30° C., the tester and belt were cooled at that temperature for an hour, and then the belt was run for five minutes and cooled again for an hour. The low temperature durability of each belt was evaluated by how many cycles were repeated until any cog cracked.

c) Power Transmission Capability Test on Cogged V-belts

A power transmission capability test was conducted on each belt in a two-axis layout. The diameters of the drive and driven pulleys were both 105.8 mm. An axial load (DW) of 600 N was applied to the driven pulley. The drive pulley was rotated at 3000 rpm. The atmospheric temperature was set at 25° C. Transmitted torque was gradually increased. The belt power transmission capability was evaluated by the transmitted torque when the belt percentage slip reached to 2%.

d) High-Temperature Durability Test on Hybrid V-belts

The resultant belt was subjected to a durability test in a two-axis layout. The diameters of the drive and driven pulleys were 126 mm and 71 mm, respectively. An axial load (DW) of 1100 N was applied to the driven pulley. The torque to the drive shaft was set at 63 Nm, and the drive pulley was rotated at 5300 rpm. The atmospheric temperature during belt travel was set at 110° C. First, the belt was run for 24 hours, then removed from the tester, and measured for permanent set in terms of interference (t2−t1).

Thereafter, the atmospheric temperature was decreased to 90° C., and the running test was continued by continuing to run the belt until the rubber layer of either one of the tension members cracked. The total running time of the belt until it cracked was defined as a high-temperature durable life.

In addition, belts using typical rubber formulations were measured for lateral surface temperature in travel 50 hours after the start of travel at 90° C. by an infrared non-contact temperature sensor.

e) Low-Temperature Durability Test on Hybrid V-belts

The resultant belt was subjected to a durability test in a two-axis layout. The diameters of the drive and driven pulleys were 68 mm and 129 mm, respectively. An axial load (DW) of 120 kg (1176 N) was applied to the driven pulley. No torque is applied to the drive shaft, and the drive pulley was rotated at 1000 rpm. A cycle was repeated in which the atmospheric temperature was set at −35° C., the tester and belt were cooled at that temperature for two hours, and then travel for five seconds and stop for ten seconds were repeated three times. The low temperature durability of each belt was evaluated by how many cycles were repeated until the rubber layer of either one of the tension members cracked.

f) Power Transmission Capability Test on Hybrid V-belts

A power transmission capability test was conducted on each belt in a two-axis layout. The diameters of the drive and driven pulleys were both 98.5 mm. An axial load (DW) of 3000 N was applied to the driven pulley. The drive pulley was rotated at 2500 rpm. The atmospheric temperature was set at 25° C. Transmitted torque was gradually increased. The belt power transmission capability was evaluated by the transmitted torque when the belt percentage slip reached to 2%.

<Examination of Data in Tables 2-1 to 2-16>

Figure 7:
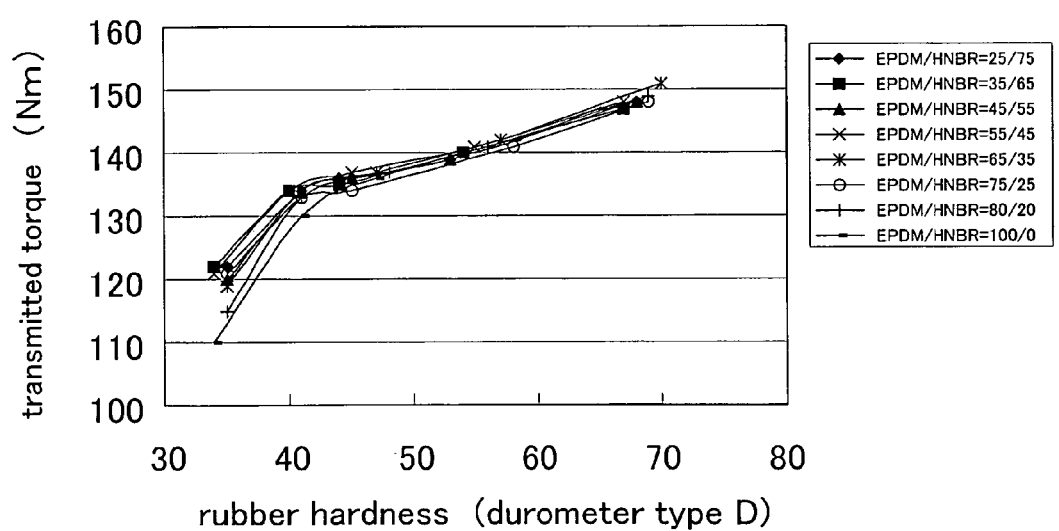
FIG. 7 is a graph showing the relationships between the rubber hardnesses of cogged V-belts and their transmitted torques.

With reference to the data shown in Tables 2-1 to 2-16, a graph is plotted between rubber hardness and transmitted torque which is the principal performance of each V-belt. FIG. 7 shows the relationships of the cogged V-belts, and FIG. 8 shows the relationships of the hybrid V-belts.

Figure 8:
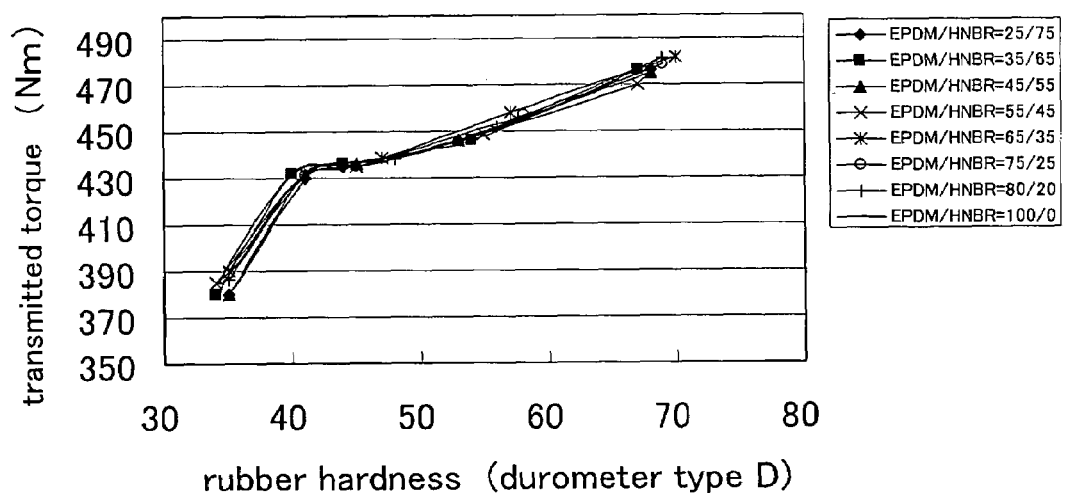
FIG. 8 is a graph showing the relationships between the rubber hardnesses of hybrid V-belts and their transmitted torques.

Referring to FIGS. 7 and 8, in any of the cogged V-belts and hybrid V-belts, the transmitted torque is abruptly decreased when the rubber hardness is decreased beyond 40. This shows that in order to transmit sufficient torque via any of the cogged and hybrid V-belts, the rubber hardness is preferably 40 or more.

Figure 9:
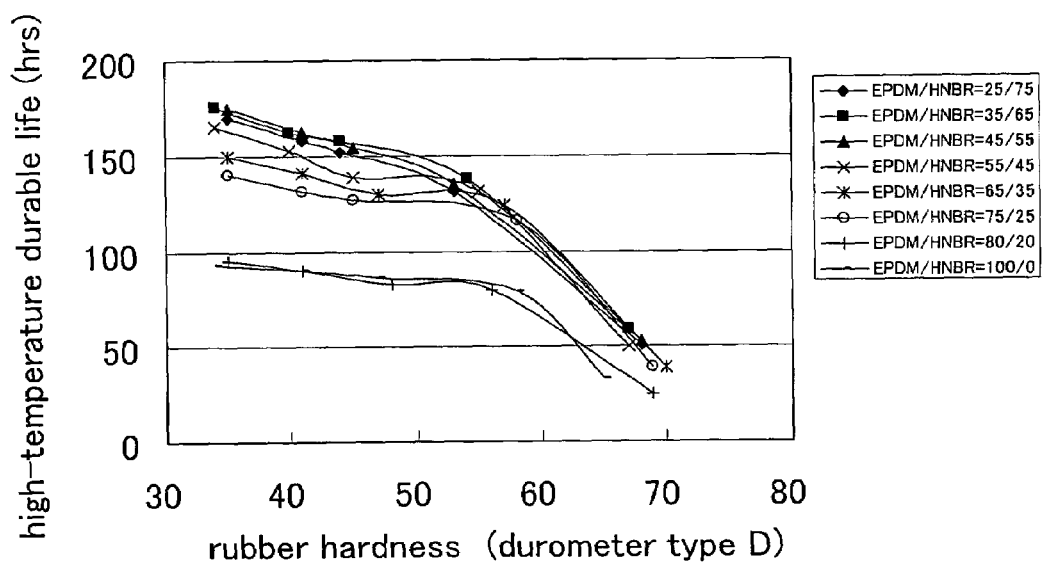
FIG. 9 is a graph showing the relationships between the rubber hardnesses and high-temperature durable lives of cogged V-belts.

With reference to the data shown in Tables 2-1 to 2-16, a graph is plotted between rubber hardness and high-temperature durable life. FIG. 9 shows the relationships of the cogged V-belts, and FIG. 10 shows the relationships of the hybrid V-belts.

Figure 10:
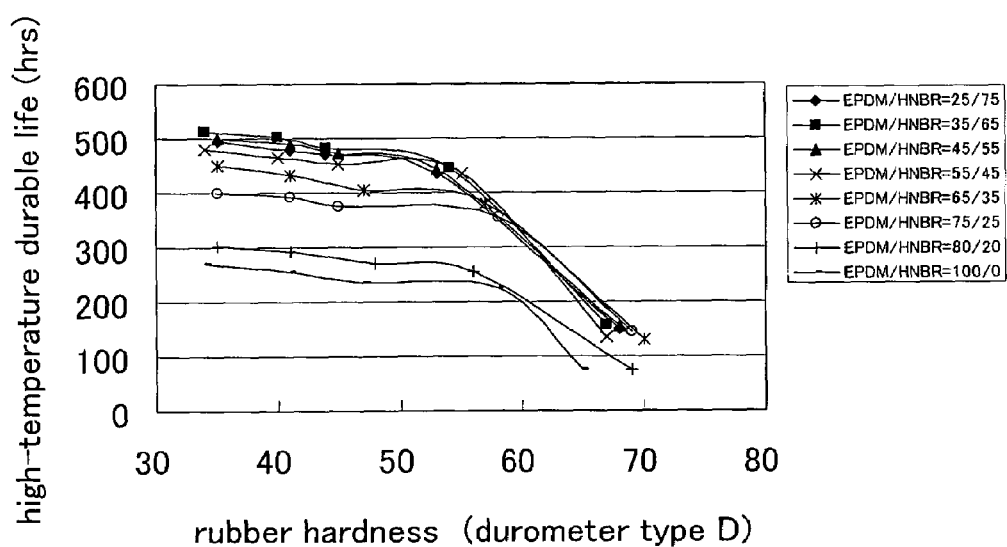
FIG. 10 is a graph showing the relationships between the rubber hardnesses and high-temperature durable lives of hybrid V-belts.

Referring to FIGS. 9 and 10, in any of the cogged V-belts and hybrid V-belts, the high-temperature durable life is abruptly shortened when the rubber hardness exceeds 60. In other words, the belt becomes likely to crack. Therefore, in order to enhance the power transmission capability, higher rubber hardness is more preferable. However, as clearly seen from FIGS. 9 and 10, excessively high rubber hardness will extremely deteriorate rubber cracking resistance and in turn extremely shorten high-temperature durable life.

As can be seen from these points, the rubber material for heavy duty power transmission V-belts preferably have a rubber hardness between 40 and 60 when measured by a durometer Type D. Furthermore, it can be said that in order to obtain high-temperature durability while achieving high power transmission capability, the rubber hardness preferably ranges from 45 to 58.

Figure 11:
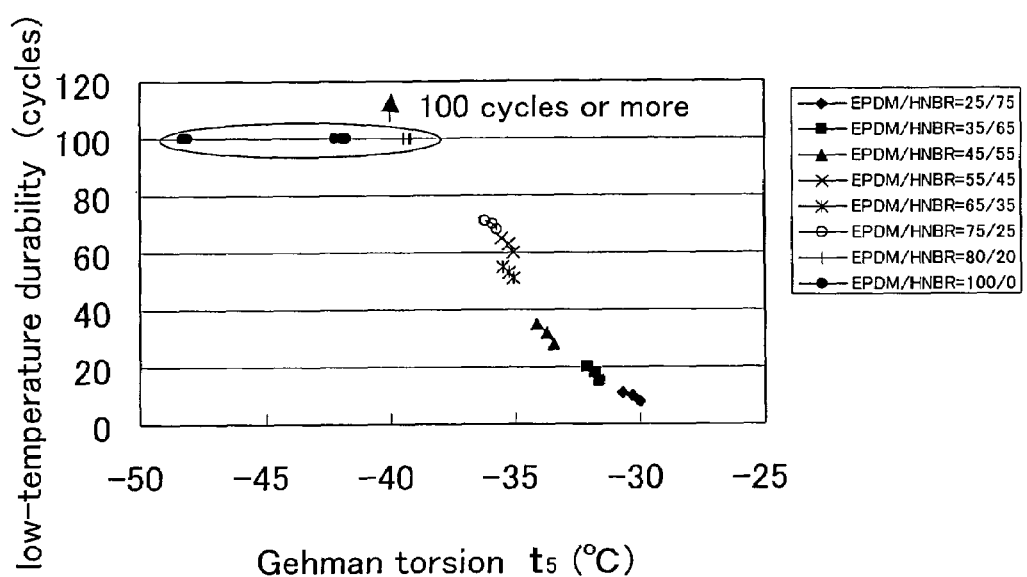
FIG. 11 is a graph showing the relationships between the Gehman torsion levels $t_5$ and cold durable cycles of cogged V-belts.

With reference to the data shown in Tables 2-1 to 2-16, a graph is plotted between Gehman torsion level $t_5$ and low-temperature durability. FIG. 11 shows the relationships of the cogged V-belts, and FIG. 12 shows the relationships of the hybrid V-belts.

Figure 12:
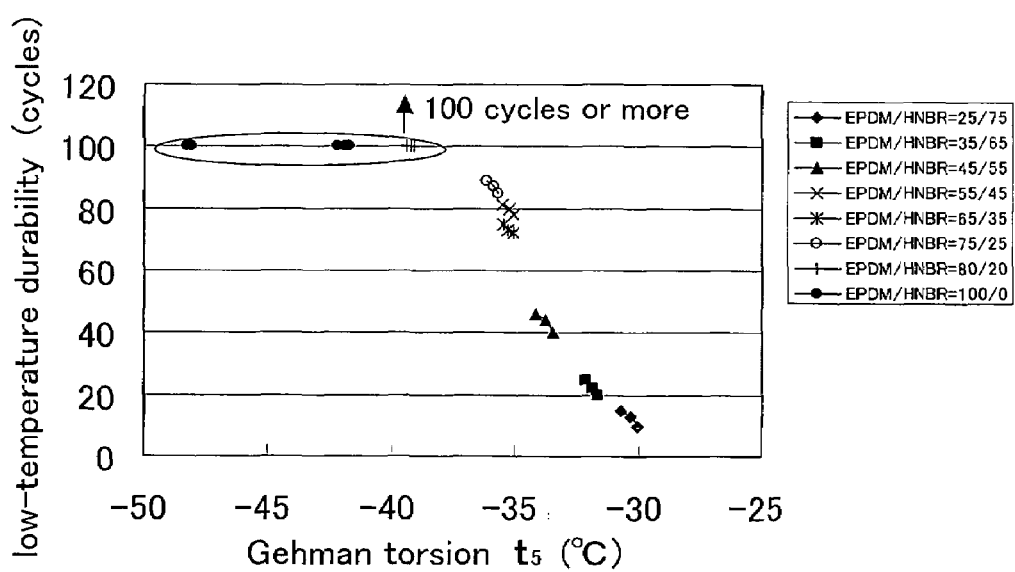
FIG. 12 is a graph showing the relationships between the Gehman torsion levels $t_5$ and cold durable cycles of hybrid V-belts.

Referring to FIGS. 11 and 12, in any of the cogged V-belts and hybrid V-belts, the low-temperature durability is considerably decreased when $t_5$ is increased beyond −35° C. Generally, cogged V-belts are required to have a low-temperature durability of 50 cycles or more, and hybrid V-belts are required to have a low-temperature durability of 60 cycles or more. The figures show that in order to these requirements, the Gehman torsion level $t_5$ is preferably between −50° C. and −35° C. Furthermore, it can be read from the figures that in order to provide a very excellent low-temperature durability of 100 cycles or more, any of the cogged and hybrid V-belts is required to have a Gehman torsion level $t_5$ of −37° C. or less.

Rubber materials used for heavy duty power transmission V-belts are required to exhibit a small permanent set when undergoing heat and stress. The variation in the center distance of each cogged V-belt shown in Tables 2-1 to 2-16 can be considered to principally result from that deformation due to high lateral pressure from the pulley has been left as a permanent set because the above high-temperature durability test is an accelerated evaluation carried out at high temperatures for a short period of time. If the permanent set is large, this may cause belt breakage in the vicinity of the cord or separation failure.

Figure 13:
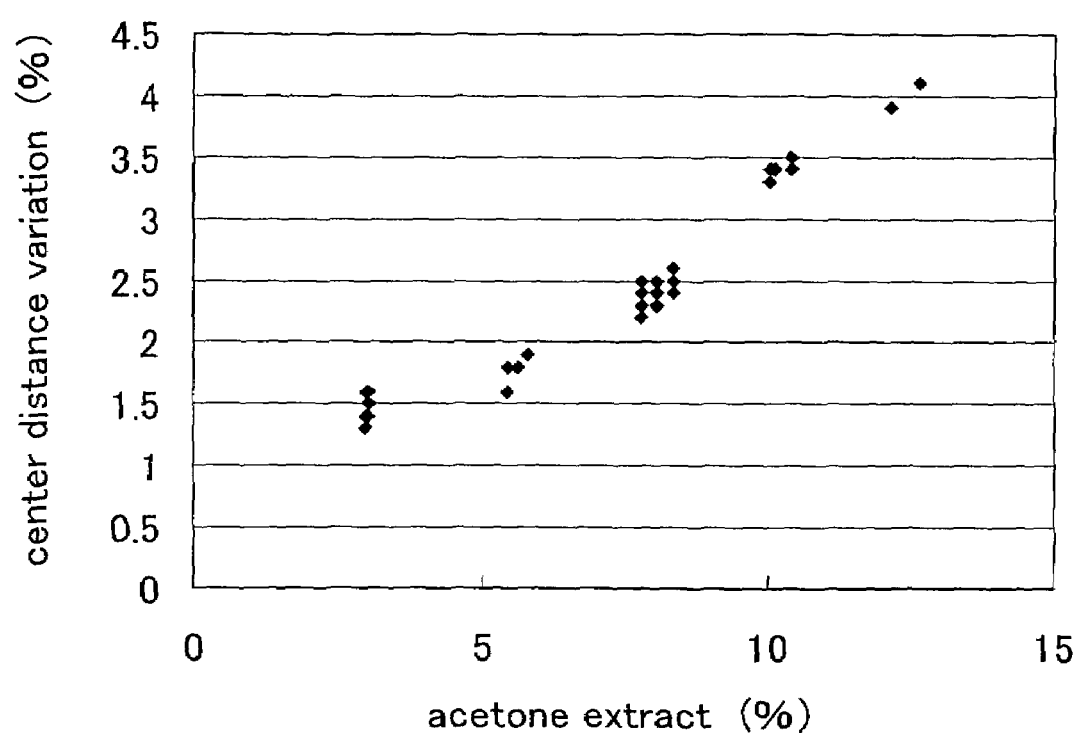
FIG. 13 is a graph showing the relationships between the amounts of acetone extract and center distance variations of cogged V-belts.

FIG. 13 is a graph plotted between the center distance variations and the amounts of acetone extract of the cogged V-belts with reference to the data shown in Tables 2-1 to 2-16. When the amount of acetone extract exceeds approximately 9%, the center distance variation due to permanent set becomes as large as 3% or more. In other words, in order to reduce permanent set of the belt due to lateral pressure, it is necessary to reduce the acetone extract of the rubber to about 9% or less. It can be said that the acetone extract is preferably 7% or less, more preferably 6% or less.

The permanent set of the tension member of a hybrid V-belt can be evaluated using the value of interference after the belt travel. If the permanent set of the tension member is large and the interference thus becomes small, the retention of blocks is deteriorated, leading to block breakage to shorten the belt life. Furthermore, noise during belt travel becomes large, and the belt abnormally produces heat. Therefore, in order to elongate the life of a hybrid V-belt, the interference of its tension member should be preserved.

Figure 14:
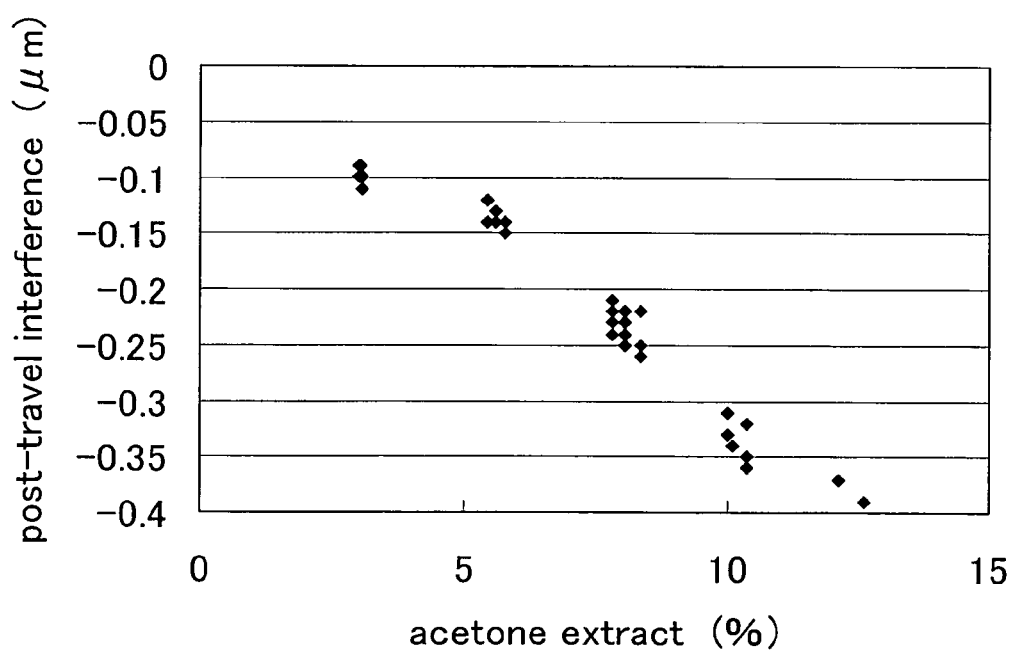
FIG. 14 is a graph showing the relationships between the amounts of acetone extract and post-travel interferences of hybrid V-belts.

FIG. 14 is a graph plotted between the post-travel interferences and the amounts of acetone extract of the hybrid V-belts with reference to the data shown in Tables 2-1 to 2-16. FIG. 14 shows that in order to keep the interference at −0.26 mm or more, the amount of acetone extract of a rubber material needs to be 9% or less. It can be said from the figure that the acetone extract is preferably 7% or less, more preferably 6% or less.

The principal constituents of a rubber composition extracted with acetone are oil, an antioxidant, and a polymer component of low molecular weight. It can be considered that when such organic substances of low molecular weight not contributing to crosslinkage have a large content in the crosslinked rubber, the rubber material shortens its relaxation time and in turn easily causes a permanent set.

<Relation Between Rubber Properties and Amounts of Compounding Ingredients>

As described above, it can be said that in respect of rubber properties, the rubber hardness with a durometer Type D is preferably between 40 and 60, $t_5$ by a Gehman torsion test is preferable between −50° C. and −35° C., and the acetone extract is preferably 9% or less. Exemplary formulations satisfying such rubber properties are, in Tables 2-1 to 2-16, Formulation Nos. 47–49, 62–64, 67–69, 77–79, 82–84, 92–94, 107–109, 113 and 114.

First, consideration is given to the EPDM/HNBR ratio. As clearly seen from comparison of Formulation Nos. 47–49 with Formulation Nos. 2–4, 17–19 and 32–34, the ratio of 55/45 or more (higher EPDM/HNBR ratio) can decrease the Gehman torsion level $t_5$ to low temperatures. However, as is obvious from comparison of Formulation Nos. 77–79 with Formulation Nos. 92–94 and 107–109, the ratio over 75/25 shortens the high-temperature durable life (deteriorates the cracking resistance).

Therefore, it can be said that the EPDM/HNBR ratio preferably ranges from 55/45 to 75/25. Furthermore, since the results of Formulation Nos. 62–64 on the Gehman torsion level $t_5$ and high-temperature durable life are excellent, the EPDM/HNBR ratio can be said to more preferably range from 60/40 to 70/30.

Figure 15:
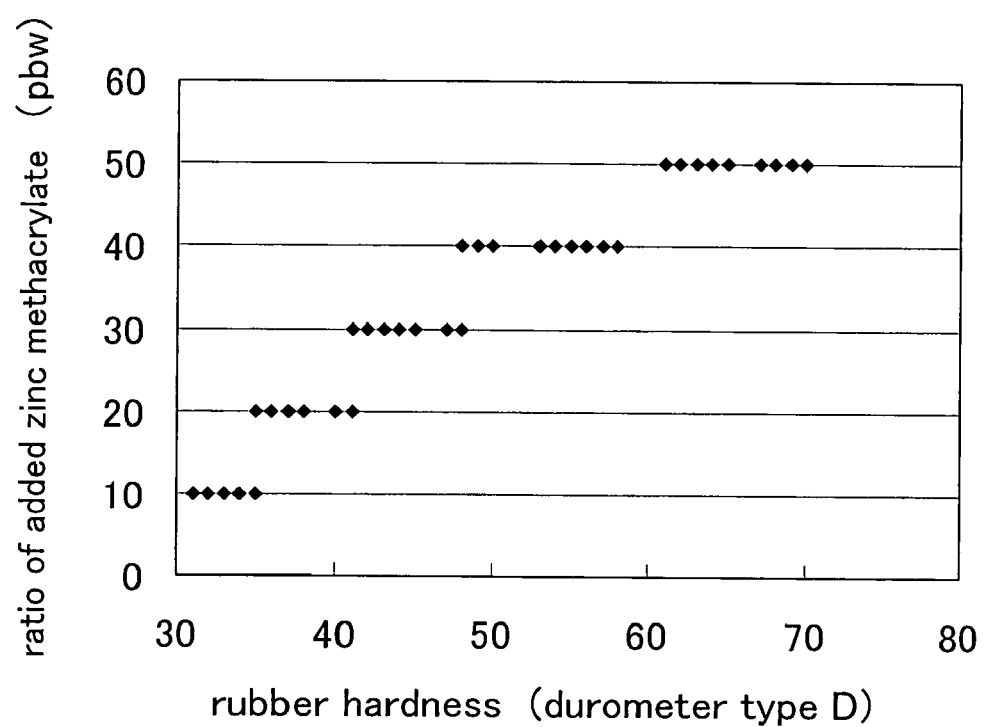
FIG. 15 is a graph showing the relationship between the mixing ratio of zinc dimethacrylate and rubber hardness.

Next, consideration is given to the amount of zinc dimethacrylate. FIG. 15 is a graph plotted between the mixing ratio of zinc dimethacrylate and rubber hardness with reference to the results shown in Tables 2-1 to 2-16. As is obvious from FIG. 15 and comparison of Formulation Nos. 47–49 with Formulation No. 46, when the mixing ratio of zinc dimethacrylate is low, the rubber hardness becomes excessively low and the transmitted torque is thus insufficient. Furthermore, as is obvious from comparison of Formulation Nos. 47–49 with Formulation No. 50, when the mixing ratio of zinc dimethacrylate is high, the rubber hardness becomes high but the cracking resistance is deteriorated to adversely affect the high-temperature durability. These tendencies are also true for Formulation Nos. 61–65 and 76–80.

Therefore, from these results, the mixing ratio of zinc dimethacrylate can be said to preferably range from 20 to 40 parts by weight. Furthermore, since the results of Formulation Nos. 48, 63 and 78 on the transmitted torque and high-temperature durable life are excellent, the mixing ratio of zinc dimethacrylate can be said to more preferably range from 25 to 35 parts by weight. Furthermore, FIG. 15 shows that in order to set the rubber hardness between 40 and 60, the mixing ratio of zinc dimethacrylate needs to range approximately from 20 to 40 parts by weight.

Next, consideration is given to the amount of acetone extract. For example, Formulation Nos. 53, 54, 58 and 59 have a large amount of oil unlike Formulation Nos. 48 and 49, and therefore their amounts of acetone extract become large (10% or more). Additionally considering the center distance variations of the above cogged V-belts and the post-travel interferences of the above hybrid V-belts, as the amount of acetone extract is increased, the center distance variation becomes larger and the post-travel interference becomes negatively larger. That is, the rubber permanent set becomes larger. This tendency is also true for Formulation Nos. 62–64, 67–69, 73, 74, 77–79, 82–84, 88 and 89.

Therefore, from these results, the amount of acetone extract can be said to be preferably 9% or less. Furthermore, since the results of Formulation Nos. 62–64 and 77–79 on the center distance variation and post-travel interference are excellent, the amount of acetone extract can be said to be more preferably 6% or less.

Figure 16:
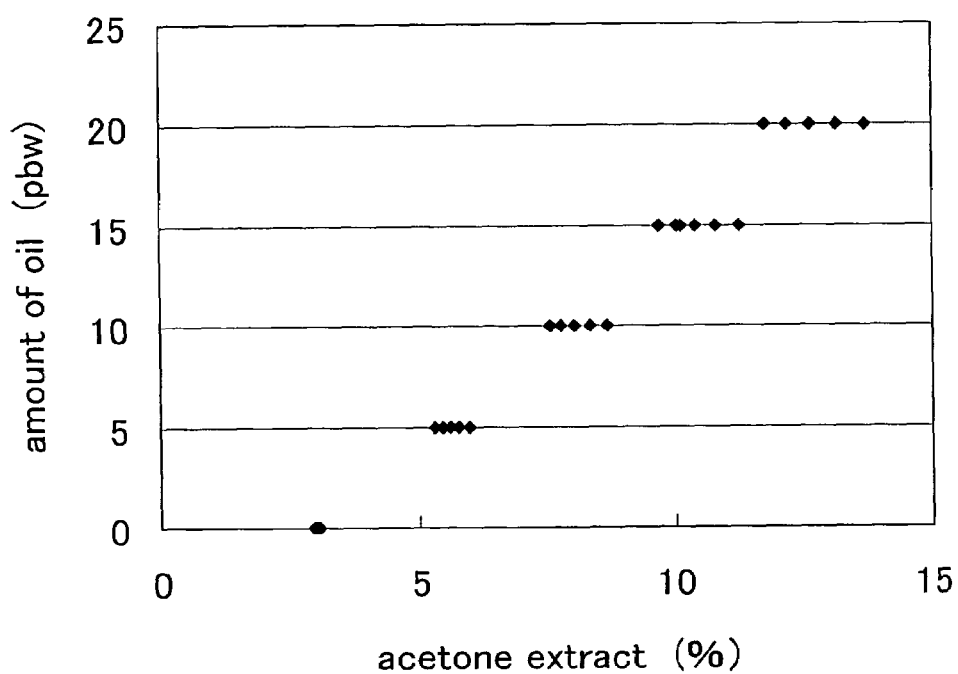
FIG. 16 is a graph showing the relationship between the amount of acetone extract and the mixing ratio of oil.
Figure 17:
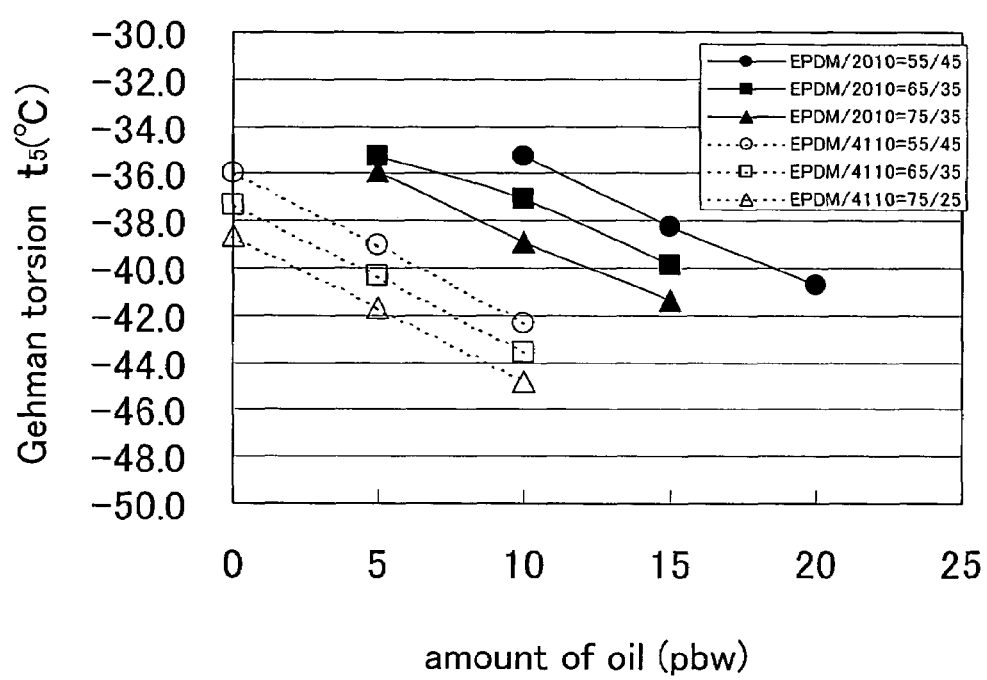
FIG. 17 is a graph showing the relationship between the amount of oil and Gehman torsion level $t_5$.

FIG. 16 is a graph plotted between the amount of oil mixed and the amount of acetone extract with reference to the results shown in Tables 2-1 to 2-16. It can be seen from the figure that the amount of oil mixed into rubber needs to be approximately 10 parts by weight or less in order to set the acetone extract at 9% or less, and approximately 5 parts by weight or less in order to set the acetone extract at 6% or less.

Furthermore, as can be seen from FIGS. 13, 14 and 16, it is desirable that the amount of oil mixed into a rubber composition is 5 parts by weight or less in order to further reduce the rubber permanent set.

The same results as in Tables 2-1 to 2-16 were also obtained when EPM of Table 1 was used instead of the above EPDM and when ethylene-octene-copolymer of Table 1 was used instead. However, if the above EPDM is replaced by the other grades of EPDM or the other ethylene-α-olefin elastomers in the exact same compounding ratio, the rubber hardness has a slightly different value due to a difference in polymer crystallinity. Therefore, in such a case, the rubber hardness needs to be controlled by changing the amount of carbon black or other fillers.

Furthermore, in order to obtain a suitable cold resistance, it is desirable that the ethylene-α-olefin elastomer (EPM, EPDM or ethylene-octene-copolymer) is of amorphous grade as shown in Table 1.

The same effects could also be obtained when zinc diacrylate was used instead of zinc dimethacrylate. Therefore, it was found that any polymerizable metal salt monomers of organic acids, typically such as zinc dimethacrylate and zinc diacrylate, were effectively used for the present invention.

<Examination of Data in Tables 3-1 and 3-2>

An example of effective means for obtaining sufficient cold resistance even at a mixing ratio of oil of 5 parts by weight or less (acetone extract of 6% or less) is, instead of using HNBR (Zetpol 2010) containing 36% bound acrylonitrile shown in Tables 2-1 to 2-16, to use HNBR 2 (Zetpol 4110) containing 17% bound acrylonitrile shown in Tables 3-1 and 3-2.

Tables 3-1 and 3-2 show examination results of formulation examples when the mixing ratio of zinc dimethacrylate is 30 parts by weight, the mixing ratio of EPDM in 100 parts by weight of rubber component is changed within the range of 55 to 75 parts by weight (i.e., the mixing ratio of HNBR 2 is changed within the range of 45 to 25 parts by weight), and the mixing ratio of oil is changed within the range of 0 to 10 parts by weight. The rubber properties of the formulation examples are as follows: the rubber hardness measured with a durometer Type D is between 40 to 60, $t_5$ given by a Gehman torsion test is between −50° C. and −35° C., and the amount of acetone extract is 9% or less.

Gehman torsion level $t_5$ was compared between Formulation Nos. 121–129 in Tables 3-1 and 3-2, having a EPDM/HNBR ratio of between 55/45 and 75/25 and 30 parts by weight of zinc dimethacrylate, and Formulation Nos. 48, 53, 59, 63, 68, 73, 78, 83 and 88 in Tables 2-7 to 2-11 having the same EPDM/HNBR ratio and the same mixing ratio of zinc dimethacrylate.

When use is made of HNBR 1 containing 36% bound acrylonitrile (Zetpol 2010) as shown in Formulation Examples of Tables 2-7 to 2-11, in order to decrease the Gehman torsion level $t_5$ to a low temperature of −35° C. or less under the condition of 5 parts by weight or less of oil in rubber component, the EPDM/HNBR ratio needs to be increased to 65/35 and further 75/25. On the other hand, when use is made of HNBR 2 containing 17% bound acrylonitrile (Zetpol 4110), equivalent Gehman torsion levels $t_5$ are achieved even when the mixing ratio of oil is about 10 parts by weight smaller than those of Formulation Examples of Tables 2-7 to 2-11. In other words, desired cold resistance can be provided in a wide range of the EPDM/HNBR ratio from 55/45 to 75/25, even at 0 to 5 parts by weight of oil in rubber component.

Therefore, in order to achieve both of more excellent cold resistance and small permanent set of a belt, the bound acrylonitrile content in HNBR used can be said to be preferably 20% or less.

Furthermore, Tables 3-1 and 3-2 give to typical Formulation Examples Nos. 121, 124 and 127 the results of the high-temperature durability test, "High-temperature durable life: fine dispersion (hrs)", using a compounding method in which the above-described zinc dimethacrylate is dispersed into HNBR and then the HNBR is blended with EPDM.

The formulation examples in which zinc dimethacrylate is fine dispersed into HNBR clearly exhibited an elongated durable life over the other normal formulation examples. This is probably because the fine dispersion of zinc dimethacrylate into HNBR enhanced the cracking resistance of the rubber composition.

An example of rubber materials in which zinc dimethacrylate is fine dispersed into HNBR is Zeoforte ZSC produced by Zeon Corporation. Zeoforte ZSC is prepared by using known methods to classify zinc oxide to remove coarse particles of 20 μm or more, add and mix the zinc oxide and a methacrylic acid into HNBR to react in situ, thereby producing a metal salt.

<Short Fibers>

Tables 4-1 and 4-2 show the results of measurement of hybrid and cogged V-belts on lateral surface temperature under high-temperature durability test. These hybrid and cogged V-belts were fabricated from rubber composition formulations obtained by changing the amount of short fibers mixed into a peroxide-crosslinked rubber of a EPDM/HNBR 1 ratio of 65/35 and a mixing ratio of zinc dimethacrylate of 30 parts by weight. In each formulation, the amount of silica mixed thereinto was controlled to give a rubber hardness of 50.

TABLE 4-1

Temperatures of hybrid V-belts at self-heating depending upon the types and amounts of short fibers

| Short fiber type (length: 3 mm) | Tensile modulus (GPa) | Mixing ratio (parts by weight) | | | | |
|---|---|---|---|---|---|---|
| | | 3 | 5 | 10 | 20 | 25 |
| Short nylon fibers | 5 | 140 | 136 | 135 | 133 | 133 |
| Short co-poly(paraphenylene-3,4'-oxydiphenylene-terephthalamide) fibers | 70 | 135 | 125 | 122 | 121 | 121 |
| Short poly(paraphenylene-terephthalamide) fibers | 72 | 134 | 123 | 121 | 120 | 120 |
| Short poly(metaphenylene-isophthalamide) fibers | 17 | 138 | 127 | 124 | 122 | 122 |
| Short poly(paraphenylene-benzobisoxazole) fibers | 270 | 133 | 121 | 120 | 120 | 120 |
| Short polyvinyl alcohol fibers | 26 | 137 | 126 | 123 | 122 | 122 |
| Short holaromatic polyester fibers | 83 | 135 | 124 | 122 | 121 | 121 |

(unit: ° C.)

TABLE 4-2

Temperatures of cogged V-belts at self-heating depending upon the types and amounts of short fibers

| Short fiber type (length: 3 mm) | Tensile modulus (GPa) | Mixing ratio (parts by weight) | | | | |
|---|---|---|---|---|---|---|
| | | 3 | 5 | 10 | 20 | 25 |
| Short nylon fibers | 5 | 141 | 138 | 137 | 136 | 136 |
| Short co-poly(paraphenylene-3,4'-oxydiphenylene-terephthalamide) fibers | 70 | 138 | 128 | 125 | 124 | 124 |
| Short poly(paraphenylene-terephthalamide) fibers | 72 | 135 | 125 | 124 | 122 | 122 |
| Short poly(metaphenylene-isophthalamide) fibers | 17 | 139 | 129 | 126 | 124 | 124 |
| Short poly(paraphenylene-benzobisoxazole) fibers | 270 | 135 | 125 | 123 | 121 | 121 |
| Short polyvinyl alcohol fibers | 26 | 139 | 128 | 125 | 123 | 123 |
| Short holaromatic polyester fibers | 83 | 137 | 127 | 125 | 123 | 122 |

(unit: ° C.)

As is obvious from Tables 4-1 and 4-2, when use is made of only short nylon fibers with a tensile modulus of about 5 GPa, the matrix rubber needs to have a higher elastic modulus in order to provide a rubber hardness capable of achieving a sufficient belt power transmission capability. In this case, the self-heating of rubber at the belt bending becomes considerably great. A great deal of rubber self-heating presents problems of induced rubber cracking due to heat aging and increased rubber permanent set. It can be seen that also when the mixing ratio of short fibers is as small as 3 parts by weight, the matrix rubber needs to have a higher elastic modulus and therefore the rubber self-heating becomes great.

The results of Tables 4-1 and 4-2 show that in order to preserve belt power transmission capability and suppress belt self-heating, the rubber needs to contain 5 parts by weight or more of short organic fibers with a tensile modulus of 15 GPa to 300 GPa. Over 20 parts by weight of short fibers decrease the effect of suppressing belt self-heating. Furthermore, this extremely deteriorates the processability of the rubber composition, leading to the problems that a flat rubber sheet cannot be formed, the tackiness between rubber sheets is lost and it becomes very difficult to mold a belt. Furthermore, the compounding cost of the rubber composition becomes high. In consideration of these points, the mixing ratio of short fibers preferably ranges from 5 to 20 parts by weight.

The invention claimed is:

1. A rubber composition for a heavy duty power transmission belt, the rubber composition having a rubber hardness of 40 to 60 when measured with a durometer Type D, a value of t5 of −50° C. to −35° C. when given by a Gehman torsion test, and an amount of acetone extract of 9% or less, wherein:
   (a) 20 to 40 parts by weight of a metal salt monomer of an organic acid is mixed into 100 parts by weight of a rubber component composed of an ethylene-α-olefin elastomer and hydrogenated acrylonitrile butadiene rubber;
   (b) 5 to 35 parts by weight of short fibers are mixed into 100 parts by weight of the rubber component; and
   (c) the amount of the ethylene-α-olefin elastomer in 100 parts by weight of the rubber component is 55 to 75 parts by weight.

2. The rubber composition for a heavy duty power transmission belt of claim 1, wherein the short fibers comprise organic short fibers with a tensile modulus of 15 GPa to 300 GPa, and 5 to 20 parts by weight of the organic short fibers are mixed into the rubber component.

3. The rubber composition for a heavy duty power transmission belt of claim 2, wherein the organic short fibers comprise at least one type of fibers selected from the group of poly(paraphenylene-terephthalamide) fibers, co-poly(paraphenylene-3,4'-oxydiphenylene-terephthalamide) fibers, poly-(metaphenylene-isophthalamide) fibers, poly(paraphenylene-benzobisoxazole) fibers, polyvinyl alcohol fibers, and holaromatic polyester fibers.

4. A heavy duty power transmission cogged V-belt wherein at least one of rubber elements constituting the belt is formed from the rubber composition of claim 1.

5. A heavy duty power transmission V-belt comprising: a tension member formed of a rubber layer having a cord embedded thereinto; and a plurality of blocks engaged at specified pitches and intervals in the lengthwise direction of the belt with the tension member,
wherein the rubber layer is formed from the rubber composition of claim 1.

6. The rubber composition for a heavy duty power transmission belt of claim 1, wherein the ethylene-α-olefin elastomer is of amorphous grade, the bound acrylonitrile content in the hydrogenated acrylonitrile butadiene rubber is 20% or less, and the metal salt monomer of the organic acid is zinc dimethacrylate or zinc diacrylate.

7. The rubber composition of claim 1, wherein the mixing ratio of oil per 100 parts by weight of the rubber component is less than 5 parts by weight.

8. The rubber composition of claim 1, wherein the amount of acetone extract is 7% or less.

9. The rubber composition of claim 8, wherein the amount of acetone extract ranges from 3 to 7%.

10. The rubber composition of claim 1, wherein the amount of acetone extract is 6% or less.

11. The rubber composition of claim 10, wherein the amount of acetone extract ranges from 3 to 6%.

* * * * *

UNITED STATES PATENT AND TRADEMARK OFFICE
CERTIFICATE OF CORRECTION

PATENT NO. : 7,189,785 B2  Page 1 of 1
APPLICATION NO. : 10/494308
DATED : March 13, 2007
INVENTOR(S) : Shigeki Okuno It is certified that error appears in the above-identified patent and that said Letters Patent is hereby corrected as shown below:

Title Page; should read;

(54) RUBBER COMPOSITION FOR HEAVY DUTY POWER TRANSMISSION BELT AND HEAVY DUTY POWER TRANSMISSION BELT USING THE SAME

Signed and Sealed this

Tenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,189,785 B2 Page 1 of 1
APPLICATION NO. : 10/494308
DATED : March 13, 2007
INVENTOR(S) : Shigeki Okuno It is certified that error appears in the above-identified patent and that said Letters Patent is hereby corrected as shown below:

Title Page Item (54) and Column 1, lines 1-4, should read;

-- RUBBER COMPOSITION FOR HEAVY DUTY POWER TRANSMISSION BELT AND HEAVY DUTY POWER TRANSMISSION BELT USING THE SAME --

This certificate supersedes the Certificate of Correction issued February 10, 2009.

Signed and Sealed this

Tenth Day of March, 2009

JOHN DOLL
*Acting Director of the United States Patent and Trademark Office*